US012432519B2

(12) United States Patent
Koppens et al.

(10) Patent No.: US 12,432,519 B2
(45) Date of Patent: Sep. 30, 2025

(54) AUDIO APPARATUS AND METHOD THEREFOR

(71) Applicant: KONINKLIJKE PHILIPS N.V., Eindhoven (NL)

(72) Inventors: Jeroen Gerardus Henricus Koppens, Nederweert (NL); Sam Martin Jelfs, Valkenswaard (NL); Patrick Kechichian, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 199 days.

(21) Appl. No.: 18/285,900

(22) PCT Filed: Mar. 10, 2022

(86) PCT No.: PCT/EP2022/056218
§ 371 (c)(1),
(2) Date: Oct. 6, 2023

(87) PCT Pub. No.: WO2022/214270
PCT Pub. Date: Oct. 13, 2022

(65) Prior Publication Data
US 2024/0244391 A1 Jul. 18, 2024

(30) Foreign Application Priority Data
Apr. 8, 2021 (EP) .................................... 21167510

(51) Int. Cl.
*H04S 7/00* (2006.01)

(52) U.S. Cl.
CPC .............. *H04S 7/306* (2013.01); *H04S 7/302* (2013.01); *H04S 2400/05* (2013.01); *H04S 2420/01* (2013.01)

(58) Field of Classification Search
CPC ...... H04S 7/306; H04S 7/302; H04S 2400/05; H04S 2420/01
See application file for complete search history.

(56) References Cited

U.S. PATENT DOCUMENTS 10,559,295 B1 * 2/2020 Abel ........................ H04S 7/305
2003/0007648 A1 1/2003 Currell
(Continued)

OTHER PUBLICATIONS

Tor Halmrast: "A very simple way to simulate the timbre of flutter echoes in spatial audio" , EAA Spatial Audio Signal Processing Symposium, Sep. 7, 2019 (Sep. 7, 2019), pp. 115-119.
(Continued)

*Primary Examiner* — David L Ton

(57) ABSTRACT

An audio apparatus for generating a flutter echo audio signal comprises a receiver (401) arranged to receive room metadata indicative of properties of a room. The room metadata may e.g. indicate dimensions of the room and/or acoustic reflection data for boundaries of the room. An estimator (405) determines a flutter echo estimate for the room in response to the room metadata where the flutter echo estimate is indicative of a level of a flutter echo in the room. A signal generator (403) includes a feedback delay network comprising a plurality of feedback loops. The signal generator (403) is arranged to generate the flutter echo audio signal from output signals of a set of feedback loops of the plurality of feedback loops being fed an audio source signal. An adapter (407) adapts a first parameter for a first feedback loop of the set of feedback loops in response to the flutter echo estimate.

23 Claims, 18 Drawing Sheets

(56) References Cited

U.S. PATENT DOCUMENTS

| | | | | |
|---|---|---|---|---|
| 2013/0202125 | A1* | 8/2013 | De Sena | G10K 15/12 381/63 |
| 2014/0153727 | A1 | 6/2014 | Walsh et al. | |
| 2018/0035233 | A1* | 2/2018 | Fielder | H04S 5/005 |
| 2022/0182779 | A1* | 6/2022 | Yen | G10L 19/008 |
| 2023/0100071 | A1* | 3/2023 | Eronen | H04S 7/305 381/303 |
| 2023/0209302 | A1* | 6/2023 | Koppens | H04S 1/007 381/1 |

OTHER PUBLICATIONS

Tor Halmrast: "Flutter Echoes; Timbre and Possible Use as Sound Effect", Proceedings of the 18th International Conference on Digital Audio Effects (DAFx-15), Dec. 3, 2015 (Dec. 3, 2015).

International Search Report and Written Opinion from PCT/EP2022/056218 mailed Jul. 4, 2022.

Jean-Marc Jot and Antoine Chaigne, "Digital delay networks for designing artificial reverberators", 90th AES Convention, 1991.

Jean-Marc Jot, "An analysis/synthesis approach to real-time artificial reverberation", Proc. ICASSP-92, 1992, vol. 2, pp. 221-224.

Fritz Menzer and Christof Faller, "Binaural reverberation using a modified Jot reverberator with frequency dependent nteraural coherence matching", 126th AES Convention Munich, May 2009.

"Image Source Model" https://reuk.github.io/wayverb/image_source.html, downloaded Aug. 15, 2023.

Stephen G. McGovern, Fast image method for impulse response calculations of box-shaped rooms, Applied Acoustics 70 (2009) 182-189.

MPEG output document N19211, "MPEG-I 6DoF Audio Encoder Input Format", MPEG 130.

Allen et al "Image Method for Efficiently Simulating Small Room Acoustics" Acoustics Reserch Dept. Jun. 6, 1978.

A-Weighting, https://en.wikipedia.org/wiki/A-weighting downloaded from Wikipedia Aug. 15, 2023.

"Sabine Equation" Science Direct, https://www.sciencedirect.com/topics/engineering/sabine-equation downloaded Aug. 15, 2023.

* cited by examiner

AUDIO APPARATUS AND METHOD THEREFOR

CROSS-REFERENCE TO PRIOR APPLICATIONS

This application is the U.S. National Phase application under 35 U.S.C. § 371 of International Application No. PCT/EP2022/056218, filed on Mar. 10, 2022, which claims the benefit of EP Patent Application No. EP21167510.3, filed on Apr. 8, 2021. These application are hereby incorporated by reference herein.

FIELD OF THE INVENTION

The invention relates to an apparatus and method for generating a flutter echo audio signal, and in particular, but not exclusively, for generating a flutter echo audio signal in combination with generation of a diffuse reverberation signal.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications, which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented/Mixed Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For example, many immersive experiences are provided by a virtual audio scene being generated by headphone reproduction using binaural audio rendering technology. In many scenarios, such headphone reproduction may be based on headtracking such that the rendering can be made responsive to the user's head movements, which highly increases the sense of immersion.

An important feature for many applications is that of how to generate and/or distribute audio that can provide a natural and realistic perception of the audio environment. For example, when generating audio for a virtual reality application it is important that not only are the desired audio sources generated but these are also modified to provide a realistic perception of the audio environment including damping, reflection, coloration etc.

For room acoustics, or more generally environment acoustics, reflections of sound waves off walls, floor, ceiling, objects etc. of an environment cause delayed and attenuated (typically frequency dependent) versions of the sound source signal to reach the listener (i.e. the user for a VR/AR system) via different paths. The combined effect can be modelled by an impulse response which may be referred to as a Room Impulse Response (RIR) hereafter (although the term suggests a specific use for an acoustic environment in the form of a room it tends to be used more generally with respect to an acoustic environment whether this corresponds to a room or not).

As illustrated in FIG. 1, a room impulse response typically consists of a direct sound that depends on distance of the sound source to the listener, followed by a reverberant portion that characterizes the acoustic properties of the room. The size and shape of the room, the position of the sound source and listener in the room and the reflective properties of the room's surfaces all play a role in the characteristics of this reverberant portion.

The reverberant portion can be broken down into two temporal regions that are usually overlapping. The first region contains so-called early reflections, which represent isolated reflections of the sound source on walls or obstacles inside the room prior to reaching the listener. As the time lag increases, the number of reflections present in a fixed time interval increases and the paths may include secondary or higher order reflections (e.g. reflections may be off several walls or both walls and ceiling etc.).

The second region in the reverberant portion is the part where the density of these reflections increases to a point that they cannot be isolated by the human brain anymore. This region is typically called the diffuse reverberation, late reverberation, or reverberation tail.

The reverberant portion contains cues that give the auditory system information about the distance of the source, and size and acoustical properties of the room. The energy of the reverberant portion in relation to that of the anechoic portion largely determines the perceived distance of the sound source. The level and delay of the earliest reflections may provide cues about how close the sound source is to a wall, and the filtering by anthropometrics may strengthen the assessment of the specific wall, floor or ceiling.

The density of the (early-) reflections contributes to the perceived size of the room. The time that it takes for the reflections to drop 60 dB in energy level, indicated by the reverberation time $T_{60}$, is a frequently used measure for how fast reflections dissipate in the room. The reverberation time provides information on the acoustical properties of the room: such as specifically whether the walls are very reflective (e.g. bathroom) or there is much absorption of sound (e.g. bedroom with furniture, carpet and curtains).

Furthermore, RIRs may be dependent on a user's anthropometric properties when it is a part of a binaural room impulse response (BRIR), due to the RIR being filtered by the head, cars and shoulders: i.e. the head related impulse responses (HRIRs).

As the reflections in the late reverberation cannot be differentiated and isolated by a listener, they are often simulated and represented parametrically with, e.g., a parametric reverberator using a feedback delay network, as in the well-known Jot reverberator.

For early reflections, the direction of incidence and distance dependent delays are important cues to humans to extract information about the room and the relative position of the sound source. Therefore, the simulation of early reflections must be more explicit than the late reverberation. In efficient acoustic rendering algorithms, the early reflections are therefore simulated differently from the later reverberation. A well-known method for early reflections is to mirror the sound sources in each of the room's boundaries to generate a virtual sound source that represents the reflection.

For early reflections, the position of the user and/or sound source with respect to the boundaries (walls, ceiling, floor) of a room is relevant, while for the late reverberation, the acoustic response of the room is diffuse and therefore tends to be more homogeneous throughout the room. This allows simulation of late reverberation to often be more computationally efficient than early reflections.

Two main properties of the late reverberation that are defined by the room are the T60 value and the reverb level. In terms of the diffuse reverberation impulse response, these values represent the slope and the amplitude of the impulse response. Both are typically strongly frequency dependent in natural rooms.

The T60 parameter is important to provide an impression of the reflectiveness and size of the room, while the reverberation level is indicative of the compound effect of multiple reflections on the room's boundaries. The reverb level and its frequency behavior is dependent on the pre-delay, indicating where the distinction between early reflections and late reverb is made (see FIG. 2).

The reverberation level has its main psycho-acoustic relevance in relation to the direct sound. The level difference between the two are an indication of the distance between the sound source and the user (or RIR measurement point). A larger distance will cause more attenuation on the direct sound, while the level of the late reverb stays the same (it is the same in the entire room). Similarly, for sources with directivity dependent on where the user is with respect to the source, the directivity influences the direct response as the user moves around the source, but not the level of the reverberation.

In order to render a realistic audio experience providing perception of the audio environment and specifically a perception of the acoustic properties of a virtual room in which the listener is considered to be positioned in, one or more audio signals and objects may be rendered through a rendering process that reflects the room impulse response. This typically includes separately generating a direct path, early reflections, and a diffuse late reverberation component and then combining this in the rendered output.

Typically, different approaches are used to generate the different components with the direct sound and early reflections often being generated by a straightforward filtering (e.g. using binaural processing and Head Related Transfer Function filters). In contrast, the diffuse late reverberation is often generated using a parametric reverberator, such as a Jot reverberator.

Such approaches may generate advantageous and naturally sounding audio in many situations and applications. However, known approaches may be suboptimal in some situations and for some applications. For example, it may in many embodiments result in rendered audio that is not a perfect representation of the intended room acoustics. In many situations, generating a more accurate acoustic environment may require additional complexity and/or computational resource. The current approaches and proposals for how to represent and generate audio representing acoustic environments may tend to be suboptimal and/or insufficient and/or incomplete. This may for example particularly be the case for e.g. virtual reality applications where the rendered acoustic environment may have a significant impact on the immersion and general user experience.

Hence, an improved approach would be advantageous. In particular, an approach that allows improved operation, increased flexibility, reduced complexity, facilitated implementation, an improved audio experience, improved audio quality, reduced computational burden, improved suitability and/or performance for virtual/mixed/augmented reality applications, improved perceptual cues, improved representation and rendering of different acoustic environments, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus for generating a flutter echo audio signal, the audio apparatus comprising: a receiver arranged to receive room metadata indicative of properties of a room; an estimator arranged to determine a flutter echo estimate for the room in response to the room metadata, the flutter echo estimate being indicative of a level of a flutter echo in the room; a signal generator including a feedback delay network comprising a plurality of feedback loops, the signal generator being arranged to generate the flutter echo audio signal from output signals of a set of feedback loops of the plurality of feedback loops being fed an audio source signal; and an adapter arranged to adapt a first parameter for a first feedback loop of the set of feedback loops in response to the flutter echo estimate.

The invention may provide an improved user experience in many embodiments and in many scenarios, and may specifically provide an improved user perception of an acoustic environment. The approach may further allow efficient communication of data allowing such improvements, and specifically in many scenarios may not require additional data but may be based on environment data (specifically room data) that may be communicated for other purposes.

In particular, the Inventors have realized that existing approaches may not accurately reflect all acoustic phenomena, and that substantial improvement may be achieved by generating and rendering a flutter echo audio signal that may provide a perception of flutter echo effects in the acoustic environment. Further, generating such a flutter echo audio signal using a signal generator comprising a feedback delay network with a plurality of feedback loops may provide a very efficient implementation while allowing an accurate rendering of flutter echo effects in many embodiments. It may furthermore allow commonality with functionality for generating diffuse reverberation and may allow a highly efficient and combined reverberator function to be provided which may e.g. dynamically adapt resources allocated to different types of reverberation and echoes.

The approach may provide adaptation that allows a more naturally sounding echo to be perceived. It may in many embodiments allow flutter echo effects to be generated without requiring dedicated data to be transmitted for controlling the echo. The apparatus may specifically determine whether to generate flutter echo or not depending on the room metadata, or may e.g. adapt a parameter (such as a delay, frequency response and/or level) of the flutter echo to provide a signal more accurately reflecting a natural acoustic environment.

The flutter echo estimate may be indicative of a level/degree/amount/prevalence of a flutter echo in the room, and specifically of a level/degree/amount/prevalence of the flutter echo relative to a diffuse reverberation in the room. The flutter echo may be a flutter echo between two opposing walls/boundaries/ sides of the room, and specifically between two parallel walls/boundaries/sides of the room.

The feedback delay network may comprise a network arranged to couple at least the audio source signal to at least the feedback loops of the set of feedback loops, and an output circuit arranged to generate the flutter echo audio signal by combining output signals of at least the feedback loops of the set of feedback loops.

The set of feedback loops may comprise one or more feedback loops.

The first parameter may for example be a feedback factor for the first feedback loop, a transfer function parameter for the first feedback loop, a frequency dependency of the first feedback loop, a loop gain of the first feedback loop, a delay of the feedback loop, a weight/gain/level for the output signal of the feedback loop and/or of the flutter echo audio signal.

In some embodiments, the adapter may be arranged to vary a number of feedback loops in the set of feedback loops in response to the flutter echo estimate.

In some embodiments, the signal generator is arranged to further generate a diffuse reverberation signal from outputs of feedback loops not included in the set of feedback loops. The diffuse reverberation signal may be generated when the audio source signal and/or other audio source signals are fed to the feedback loops not in the set of feedback loops.

In many embodiments, the apparatus may be arranged to determine the flutter echo estimate in response to a room impulse response.

The receiver may be arranged to receive the audio source signal.

According to an optional feature of the invention, the room metadata includes dimension data for the room, and the flutter echo estimate is determined in response to a room dimension in a first direction relative to a room dimension in a second direction.

This may provide a particularly advantageous operation and improved adaptive flutter echo simulation in many embodiments.

The dimension data may provide an indication of a distance between one or more opposing walls/sides/boundaries of the room.

The flutter echo estimate may be indicative of an increasing level of flutter echo for an increasing difference between the room dimension in the first direction and the room dimension in the second direction.

According to an optional feature of the invention, the room metadata includes acoustic reflection data for sides of the room and the flutter echo estimate is determined in response to an acoustic reflection attenuation of a first boundary of the room relative to acoustic reflection attenuation of a second boundary of the room.

This may provide a particularly advantageous operation and improved adaptive flutter echo simulation in many embodiments.

The first and second boundaries may be walls or sides of the room.

According to an optional feature of the invention, the adapter is arranged to increase a feedback factor from the first feedback loop to itself for the flutter echo estimate being indicative of an increasing level of the flutter echo.

This may provide particularly advantageous operation and may result in an improved user experience and a more natural perception of an acoustic environment.

The adapter may be arranged to decrease a feedback factor from the first feedback loop to a second feedback loop of the plurality of feedback loops for the flutter echo estimate being indicative of an increasing level of flutter echo. The second feedback loop may be a feedback loop not included in the set of feedback loops.

According to an optional feature of the invention, at least some feedback factors for the plurality of feedback loops to other feedback loops of the plurality of feedback loops are dependent on room dimensions of the room.

In some embodiments at least some feedback factors for the set of feedback loops to other feedback loops of the plurality of feedback loops are dependent on room dimensions of the room.

According to an optional feature of the invention, the signal generator is arranged to further generate a diffuse reverberation signal from outputs of feedback loops not included in the set of feedback loops; and the adapter is arranged to vary a number of feedback loops included in the set of feedback loops in response to the flutter echo estimate.

The approach may allow a very efficient audio emulation of a room. It may for example allow low complexity implementation as feedback loops may be used for different purposes (diffuse reverberation and feedback loop generation) with the allocation of feedback loops between these possibly being dynamically adapted.

The diffuse reverberation signal may be generated when the audio source signal and/or other audio source signals are fed to the feedback loops not in the set of feedback loops.

According to an optional feature of the invention, the signal generator comprises a delay for the audio source signal prior to being fed to a feedback loop of the set of feedback loops, and the adapter is arranged to adapt the delay in response to a position of at least one of an audio source for the audio source signal, a listener position, and a boundary of the room.

This may provide particularly advantageous operation and may result in an improved user experience and a more natural perception of an acoustic environment.

According to an optional feature of the invention, the set of feedback loops comprises at least two feedback loops and the signal generator comprises a delay for the audio source signal prior to being fed to the at least two feedback loops, the delay being different for the at least two feedback loops.

This may provide particularly advantageous operation and/or performance in many embodiments.

According to an optional feature of the invention, the set of feedback loops comprises no more than two loops.

This may provide particularly advantageous operation and/or performance in many embodiments.

According to an optional feature of the invention, the adapter is arranged to adapt feedback factors for the plurality of feedback loops such that there is no feedback from a feedback loop of the set of feedback loops to any feedback loop not comprised in the set of feedback loops.

In some embodiments, the adapter is arranged to adapt feedback factors for the plurality of feedback loops such that there is no feedback to a feedback loop of the set of feedback loops from any feedback loop not comprised in the set of feedback loops.

According to an optional feature of the invention, the signal generator is arranged to further generate a diffuse reverberation signal, and the apparatus further comprises: a spatial processor for applying a spatial processing to the flutter echo signal, the spatial processing being dependent on a position of at least one of a source of the audio source signal and a boundary of the room; a combiner for combining the diffuse reverberation signal and the flutter echo signal after spatial processing.

According to an optional feature of the invention, the audio apparatus further comprises: a spatial processor for applying a spatial processing to the flutter echo signal, the spatial processing being dependent on a position of at least one of a source of the audio source signal and a side of the room.

According to an optional feature of the invention, the audio apparatus further comprises a circuit arranged to feed a plurality of audio source signals to the plurality of feedback loops, at least one audio source signal being fed only to feedback loops of the set of feedback loops.

According to an optional feature of the invention, the signal generator comprises a gain for the audio source signal prior to being fed to a feedback loop of the set of feedback loops, and the adapter is arranged to adapt the gain in response to at least one of a position of an audio source for the audio source signal, a listener position, a position of a boundary of the room, and a reflection order for an onset of the flutter echo audio signal.

According to an optional feature of the invention, the flutter echo audio signal represents a flutter echo between a pair of opposing boundaries of the room, the signal generator comprises a frequency dependent gain for the audio source signal prior to being fed to a feedback loop of the set of feedback loops, and the adapter is arranged to adapt the gain in response to acoustic reflection data of the room metadata for room boundaries, the acoustic reflection data being indicative of a frequency dependent acoustic property for at least one room boundary not being one of the pair of opposing room boundaries.

According to an optional feature of the invention, the set of feedback loops comprises at least two feedback loops having different loop gains.

According to another aspect of the invention, there is provided a method of generating a flutter echo audio signal, the method comprising: receiving room metadata indicative of properties of a room; determining a flutter echo estimate for the room in response to the room metadata, the flutter echo estimate being indicative of a level of a flutter echo in the room; generating the flutter echo audio signal from output signals of a set of feedback loops being fed an audio source signal, the set of feedback loops comprising feedback loops of a plurality of feedback loops of a feedback delay network; and adapting a first parameter for a first feedback loop of the set of feedback loops in response to the flutter echo estimate.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
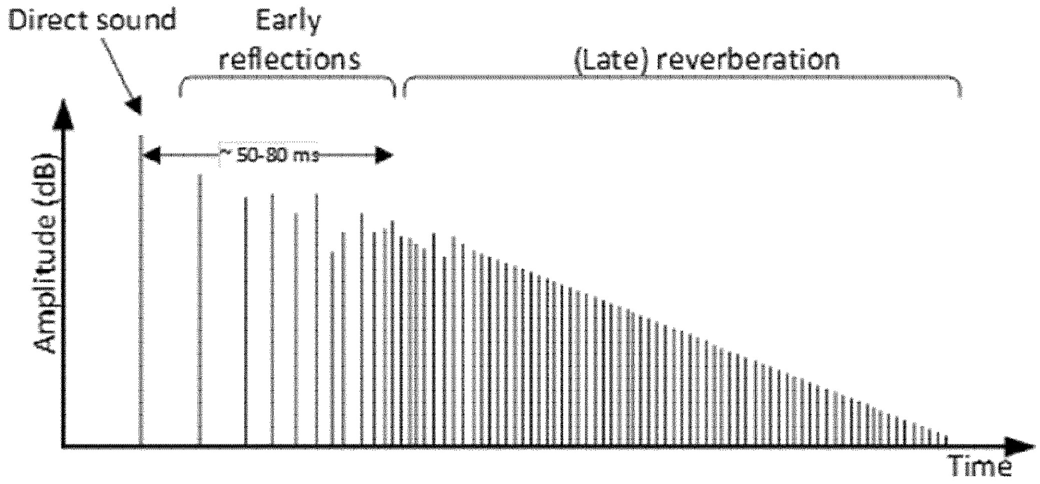
FIG. 1 illustrates an example of a room impulse response.
Figure 2:
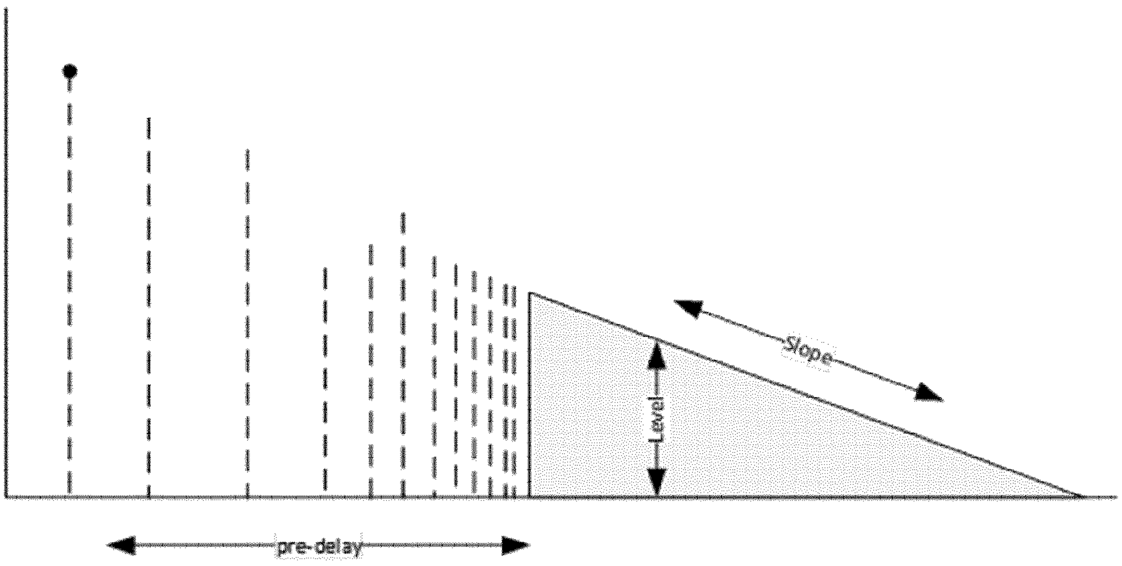
FIG. 2 illustrates an example of a room impulse response.

The following description will focus on audio processing and -generation for a virtual reality application, but it will be appreciated that the described principles and concepts may be used in many other applications and embodiments.

Virtual experiences allowing a user to move around in a virtual world are becoming increasingly popular and services are being developed to satisfy such a demand.

In some systems, the VR application may be provided locally to a user by e.g. a stand-alone device that does not use, or even have any access to, any remote VR data or processing. For example, a device such as a games console may comprise a store for storing the scene data, input for receiving/generating the user pose, and a processor for generating the corresponding images from the scene data.

In other systems, the VR application may be implemented and performed remote from the user. For example, a device local to the user may detect/receive movement/pose data which is transmitted to a remote device that processes the data to generate the user pose. The remote device may then generate suitable view images and corresponding audio signals for the user pose based on scene data describing the scene. The view images and corresponding audio signals are then transmitted to the device local to the user where they are presented. For example, the remote device may directly generate a video stream (typically a stereo/3D video stream) and corresponding audio stream which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate user poses that are continuously transmitted to the remote VR device. The remote VR device may then generate the corresponding view images and corresponding audio signals and transmit these to the local device for presentation. In other systems, the remote VR device may not directly generate the view images and corresponding audio signals but may select relevant scene data and transmit this to the local device, which may then generate the view images and corresponding audio signals that are presented. For example, the remote VR device may identify the closest capture point and extract the corresponding scene data (e.g. a set of object sources and their position metadata) and transmit this to the local device. The local device may then process the received scene data to generate the images and audio signals for the specific, current user pose. The user pose will typically correspond to the head pose, and references to the user pose may typically equivalently be considered to correspond to the references to the head pose.

In many applications, especially for broadcast services, a source may transmit or stream scene data in the form of an image (including video) and audio representation of the scene which is independent of the user pose. For example, signals and metadata corresponding to audio sources within the confines of a certain virtual room may be transmitted or streamed to a plurality of clients. The individual clients may then locally synthesize audio signals corresponding to the current user pose. Similarly, the source may transmit a general description of the audio environment including describing audio sources in the environment and acoustic characteristics of the environment. An audio representation may then be generated locally and presented to the user, for example using binaural rendering and processing.

Figure 3:
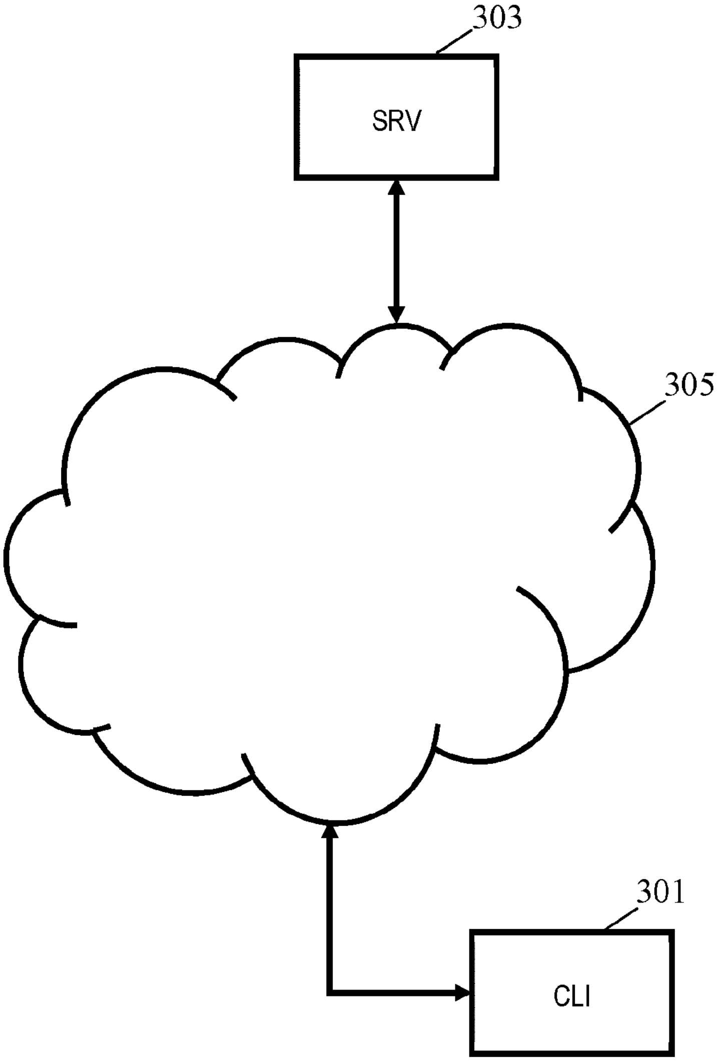
FIG. 3 illustrates an example of elements of virtual reality system.

FIG. 3 illustrates such an example of a VR system in which a remote VR client device 301 liaises with a VR server 303 e.g. via a network 305, such as the Internet. The server 303 may be arranged to simultaneously support a potentially large number of client devices 301.

The VR server 303 may for example support a broadcast experience by transmitting an image signal comprising an image representation in the form of image data that can be used by the client devices to locally synthesize view images corresponding to the appropriate user poses (a pose refers to a position and/or orientation). Similarly, the VR server 303 may transmit an audio representation of the scene allowing the audio to be locally synthesized for the user poses. Specifically, as the user moves around in the virtual environment, the image and audio synthesized and presented to the user is updated to reflect the current (virtual) position and orientation of the user in the (virtual) environment.

In many applications, such as that of FIG. 3, it may thus be desirable to model a scene and generate an efficient image and audio representation that can be efficiently included in a data signal that can then be transmitted or streamed to various devices which can locally synthesize views and audio for different poses than the capture poses.

In some embodiments, a model representing a scene may for example be stored locally and may be used locally to synthesize appropriate images and audio. For example, an audio model of a room may include an indication of properties of audio sources that can be heard in the room as well as acoustic properties of the room. The model data may then be used to synthesize the appropriate audio for a specific position.

It is a critical question how the audio scene is represented and how this representation is used to generate audio. Audio rendering aimed at providing natural and realistic effects to a listener typically includes rendering of an acoustic environment. For many environments, this includes the representation and rendering of diffuse reverberation present in the environment, such as in a room. The rendering and representation of such diffuse reverberation has been found to have a significant effect on the perception of the environment, such as on whether the audio is perceived to represent a natural and realistic environment. In the following, advantageous approaches will be described for representing an audio scene, and of rendering audio, and in particular augmentation of diffuse reverberation audio, based on this representation.

Figure 4:
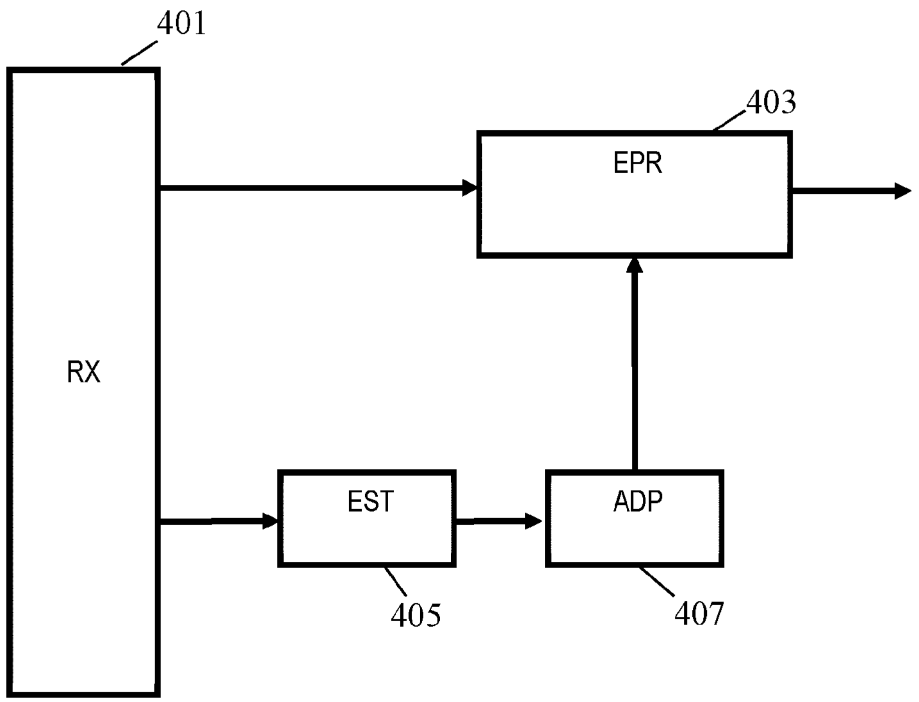
FIG. 4 illustrates an example of an audio apparatus for generating a flutter echo audio signal in accordance with some embodiments of the invention.

The approach will be described with reference to an audio apparatus as illustrated in FIG. 4. The audio apparatus is arranged to generate an audio output signal that represents audio in an acoustic environment. Specifically, the audio apparatus may generate audio representing the audio perceived by a user moving around in a virtual environment with a number of audio sources and with given acoustic properties. Each audio source is represented by an audio signal representing the sound from the audio source as well as metadata that may describe characteristics of the audio source (such as providing a level indication for the audio signal and/or a position of the audio source). In addition, metadata is provided to characterize the acoustic environment.

In the example, the audio apparatus is specifically arranged to generate an audio signal which represents how an audio source may be perceived in the current listening environment. It comprises functionality for generating direct and early reflection audio signal components as well as a diffuse reverberation audio signal component. The audio apparatus may thus receive one or more audio source signals and process one, some, or all of these to generate corresponding output signals that include the different components reflecting the behavior of the acoustic environment.

In addition, the apparatus is arranged to generate a flutter echo audio signal, which is dependent on room metadata that is indicative of properties of a room. If the acoustic environment is a room, this room may be characterized by room metadata and the audio apparatus may be arranged to generate a flutter echo audio signal that may emulate flutter echoes, which may occur in such a room. The flutter echo audio signal may be an additional audio component that is combined with the direct sound, early reflections, and/or diffuse reverberation audio components to provide a more accurate and natural perceived acoustic environment (although it will be appreciated that in some embodiments, only a flutter echo audio signal is generated). Further, as flutter echo typically is very specific to individual rooms, and indeed tends to only be significant or noticeable for some room types/properties, the audio apparatus may specifically provide a flutter echo audio signal when appropriate for the specific room, and typically with the flutter echo audio signal being adapted to reflect these specific conditions. In particular, in many embodiments, the generation of a flutter echo audio signal may be conditional on the room metadata and a flutter echo audio signal may only be generated if the room metadata meets a specific criterion.

For some room types and properties, opposing (and specifically parallel) boundaries/walls of a room may in addition to assisting in generating possible early reflections and diffuse reverberation also cause recurrent echoes at a fixed rate. Such effects may be perceived as a flutter echo reflecting sound bouncing back and forth between opposing walls with the energy decaying as the order of the reflections increases. Flutter echoes may comprise many frequencies (and specifically e.g. all audio frequencies) and are not limited to e.g. standing wave frequencies as known for room modes). They tend to be most noticeable for mid- and high frequencies.

For a flutter echo, the reflected sound is essentially returning from a reflecting wall at a fixed rate with a slightly lower level. The rate of the echo depends on the distance (i.e. time-of-flight) between the walls causing the echo. The level reduction depends on distance attenuation and reflection characteristics of the involved walls. These parameters are typically frequency dependent.

Flutter echo is an acoustic feature that may occur in many rooms where the specific room properties allow for suitable reflections, such as e.g. corridors, stairwells or rooms with very different material properties on different boundaries. Including an emulation of this acoustic effect may provide a compelling experience and create more immersion for the user. Nevertheless, commonly used methods cannot and do not perform such emulation.

The audio apparatus of FIG. 4 specifically comprises a receiver 401 which is arranged to receive room metadata that is indicative of properties of a room. The flutter echo audio signal is generated to represent flutter echo in the room and the generated output signal may specifically include flutter echo audio signal reflecting the specific flutter echo properties of the room.

The apparatus specifically generates the flutter echo audio signal using a feedback delay network. Such a feedback delay network may also be used by a parametric reverberator to generate a diffuse reverberation and the functions may thus reuse the same functionality. Such an approach may provide for reduced complexity and/or facilitated operation and may for example in some embodiments allow a dynamic and flexible allocation of resources between the diffuse reverberation and the flutter echo simulation depending on the specific room properties. For the existing structure of the feedback delay network in the parametric reverberator, the approach of FIG. 4 may add further characteristic features of a room's acoustics to the set of simulation tools employed in audio rendering thereby providing a more realistic modelling of common rooms in a virtual rendering.

The audio apparatus of FIG. 4 is arranged to generate a flutter echo audio signal and comprises the receiver 401, which is arranged to receive room metadata that is indicative of the properties of a room.

The room metadata may specifically comprise data characterizing dimensions of the room, such as the three dimensions of a rectangular room. In some embodiments only one or two dimensions of a room may be represented by the room metadata. The remaining dimension(s) may e.g. be predetermined or assumed dimensions, for example the room metadata may indicate the width and length of a room and the audio apparatus may assume a standard height. In some embodiments, absolute dimension data may be provided whereas other embodiments may alternatively or additionally employ relative dimension data information. In some embodiments, a room outline may for example be provided which not only indicates e.g. a distance between sides/boundaries/walls of the room but also the layout of the room.

Dimension data may in different embodiments be provided in different ways in different embodiments. For example, the room metadata may include distances in e.g. meters, room volume with dimension ratios, time of flight durations for each dimension, two dimensional or three dimensional data, as a mesh, etc.

In some embodiments, the room metadata may include acoustic reflection data, such as e.g. a reflection coefficient or absorption coefficient for one or more walls of the room, and in many cases for all walls/boundaries of the room.

Such information may be provided as an acoustic absorption-, transmission-, coupling-, diffusing coefficient for each of the walls of the room.

In addition to the room metadata, the receiver 401 may receive one or more audio source signals representing audio of audio sources in the room to be rendered. In many embodiments, the audio sources may be represented by audio objects, but it will be appreciated that the specific audio source signals will depend on the specific embodiment and may, for example, be channel sources or Higher Order Ambisonics (HOA) sources. The audio apparatus is arranged to generate an output signal for one or more of the received audio source signals/objects, and typically will generate an output signal including all audio sources. In many cases an output signal will be generated from a subset of all audio sources that have position metadata indicating that they are inside the room. The audio apparatus may specifically process all the received audio source signals to generate output signals that reflect the acoustic properties of the room including direct sound paths, early reflections, diffuse reverberation, and flutter echoes. The processing may for example be applied to each audio source signal sequentially or in parallel. The resulting output signals may be combined to generate a single rendering signal. For example, a binaural stereo signal may be generated by binaurally processing (at least parts) of the generated output signals for each source and then combining the binaural signals into a single output stereo signal.

It will be appreciated that the described approach may be applied to an audio apparatus that only generates a flutter echo audio signal and which does not e.g. generate any direct, early reflection, and/or diffuse reverberation signal components. However, the following description will focus on embodiments in which the audio apparatus is arranged to simulate a range of acoustic effects of typical acoustic environments.

The audio apparatus comprises a signal generator 403 which is arranged to generate one or more output signals from one or more (and typically all) received audio source signals. The signal generator 403 in the present example will generate the output signal(s) to reflect the intended acoustic environment.

Figure 5:
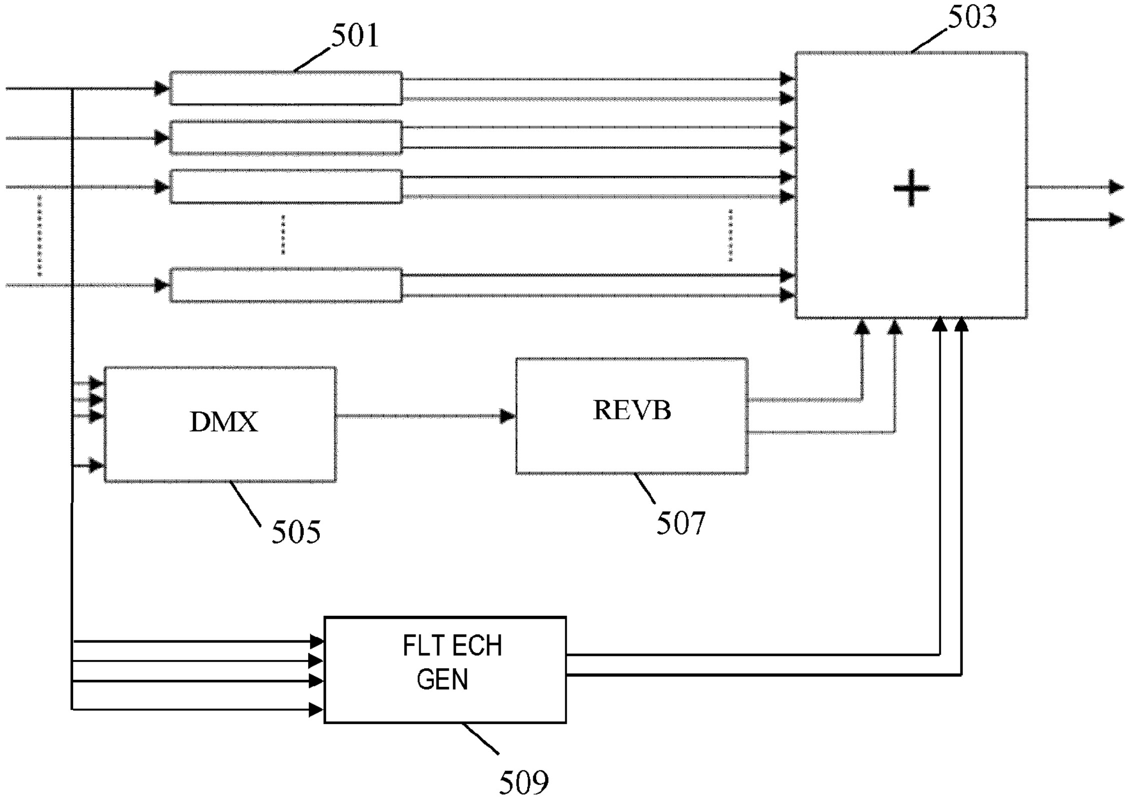
FIG. 5 illustrates an example of a signal generator for generating an audio signal in accordance with some embodiments of the invention.

FIG. 5 illustrates an example of the signal generator 403. The audio apparatus comprises a path renderer 501 for each audio source. Each path renderer 501 is arranged to generate a direct path signal component representing the direct path from the audio source to the listener. The direct path signal component is generated based on the positions of the listener and the audio source and may specifically generate the direct signal component by scaling the audio signal, potentially frequency dependently, for the audio source depending on the distance and e.g., relative gain for the audio source in the specific direction to the user (e.g. for non-omnidirectional sources).

In many embodiments, the renderer 501 may also generate the direct path signal based on occluding or diffracting (virtual) elements that are in between the source and user positions.

In many embodiments, the path renderer 501 may also generate further signal components for individual paths where these include one or more reflections. This may for example be done by evaluating reflections of walls, ceiling etc. as will be known to the skilled person. The path renderer 501 may thus also generate the early reflection components. The direct path and reflected path components may be combined into a single output signal for each path renderer and thus a single signal representing the direct path and early/discrete reflections may be generated for each audio source.

In some embodiments, the output audio signal for each audio source may be a binaural signal, e.g. generated by applying HRTF or HRIR filters based on relative (angular) positions of the audio source and listener, and thus each output signal may include both a left car and a right car (sub)signal.

The output signals from the path renderers 501 are provided to a combiner 503, which combines the signals from the different path renderers 501 to generate a single combined signal. In many embodiments, a binaural output signal may be generated and the combiner may perform a combination, such as a weighted combination, of the individual signals from the path renderers 501, i.e. all the right car signals from the path renderers 501 may be added together to generate the combined right car signals and all the left ear signals from the path renderers 501 may be added together to generate the combined left car signals.

It is appreciated that binaural rendering can be replaced by rendering to loudspeaker configurations (e.g. 2.0, 5.1, 7.1, 9.1.4, 22.2) using panning algorithms such as VBAP, generating 2 or more loudspeaker signals. The combiner 503 would in most such embodiments combine all contributions to each loudspeaker signal in the loudspeaker configuration.

The path renderers and combiner may be implemented in any suitable way including typically as executable code for processing on a suitable computational resource, such as a microcontroller, microprocessor, digital signal processor, or central processing unit including supporting circuitry such as memory etc. It will be appreciated that the plurality of path renderers may be implemented as parallel functional units, such as e.g. a bank of dedicated processing unit, or may be implemented as repeated operations for each audio source. Typically, the same algorithm/code is executed for each audio source/signal.

In addition to the individual path audio components, the audio apparatus is further arranged to generate a signal component representing the diffuse reverberation in the environment. The diffuse reverberation signal is (efficiently) generated by combining the source signals into a downmix signal and then applying a reverberation algorithm to the downmix signal to generate the diffuse reverberation signal.

The audio apparatus of FIG. 5 comprises a downmixer 505 which receives the audio signals for a plurality of the sound sources (typically all sources inside the acoustic environment for which the reverberator is simulating the diffuse reverberation), and combines them into a downmix. The downmix accordingly reflects all the sound generated in the environment. The downmix is fed to a reverberator 507, which is arranged to generate a diffuse reverberation signal based on the downmix. The reverberator 507 may specifically be a parametric reverberator such as a Jot reverberator. The reverberator 507 is coupled to the combiner 503 to which the diffuse reverberation signal is fed. The combiner 503 then proceeds to combine the diffuse reverberation signal with the path signals representing the individual paths to generate a combined audio signal that represents the combined sound in the environment as perceived by the listener.

Figure 6:
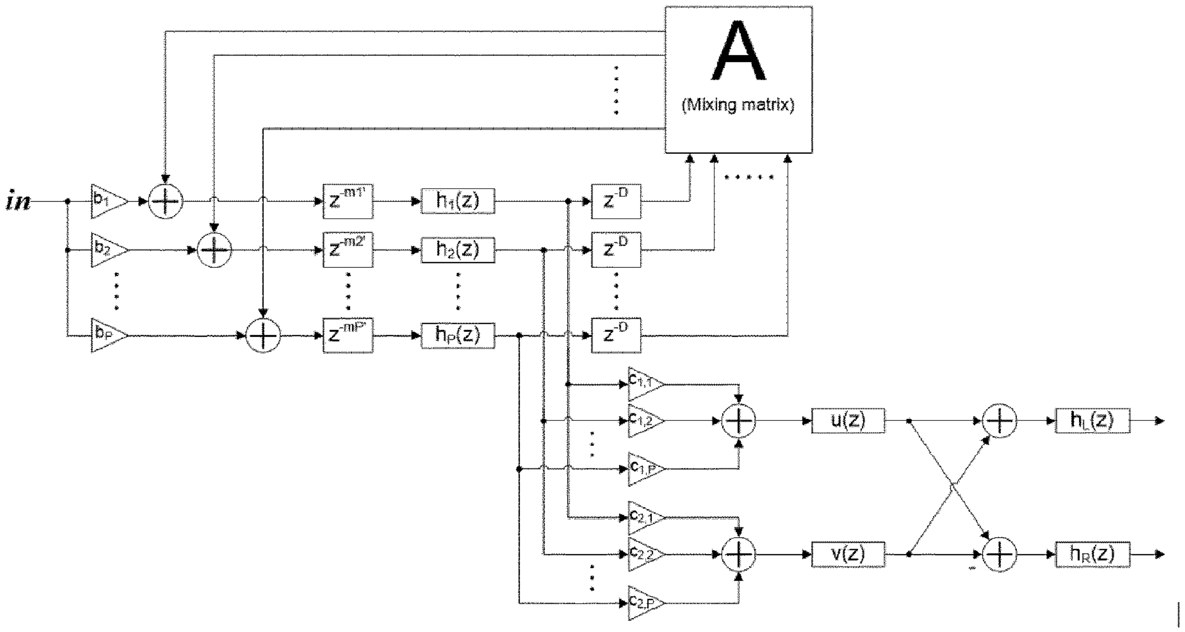
FIG. 6 illustrates an example of a Jot reverberator.

An example of a suitable reverberator is the Jot reverberator illustrated in FIG. 6. This reverberator includes a loop input vector b and a loop extraction matrix C to control how input samples are distributed over the feedback loops of the reverberator and how the output signals are generated from the loops.

The audio apparatus further comprises an echo signal generator 509, which is arranged to generate a flutter echo audio signal (and in many embodiments a plurality of flutter echo audio signals may be generated). The echo signal generator 509 receives the input audio source signal(s) and generates one or more flutter echo audio signals that are fed to the combiner 503 where it is combined with the other generated signal components to provide an output signal which reflects the acoustic properties of the room being simulated.

The echo signal generator 509, and thus the signal generator 403, comprises a feedback delay network with a plurality of feedback loops.

Figure 7:
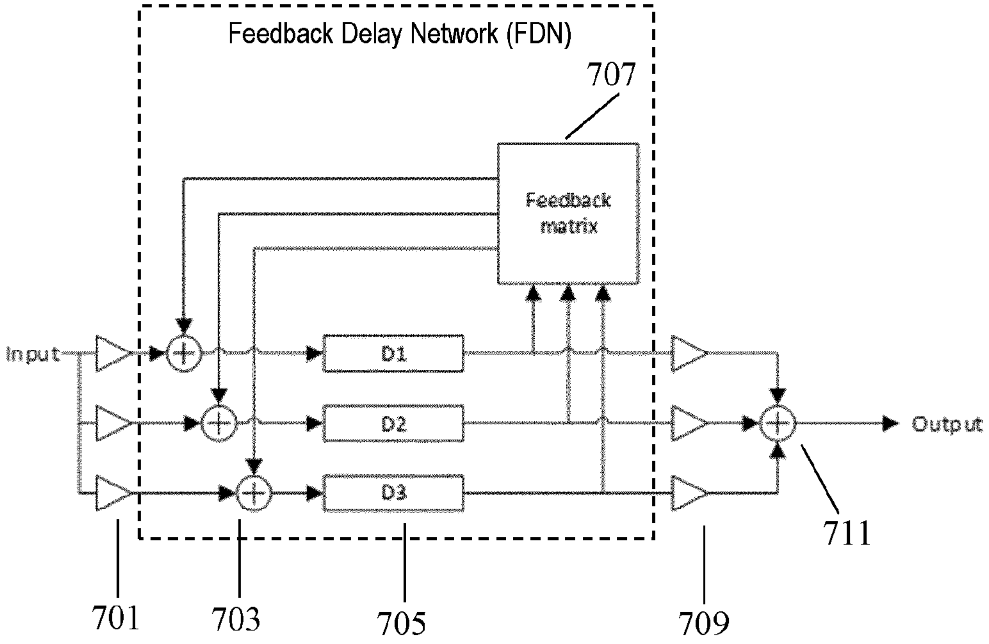
FIG. 7 illustrates an example of a flutter echo signal generator in accordance with some embodiments of the invention.

An example of such a feedback delay network of the echo signal generator 509 is illustrated in FIG. 7 where three feedback loops are illustrated. A feedback delay network may comprise a plurality of feedback loops where each (or at least one) feedback loop has an input receiving an input audio signal and where each feedback loop implements a loop transfer function (which specifically may be a delay), a feedback network feeding output signals of the feedback loops back to inputs of the loops to be combined with the input audio signal, and an output circuit arranged to generate an output signal of the feedback delay network as a combination of the output signals of the feedback loops. The feedback network may for each feedback loop implement a feedback path for the output signal of the feedback loop to an input of the feedback loop, and typically may also implement a feedback path to one or more inputs of other feedback loops. In many embodiments, the feedback network may implement a feedback path from the output of each feedback loop to each input of all feedback loops. Each feedback path typically implements an attenuation factor (or equivalently a gain factor) but may in some embodiments provide a more complex feedback path, such as e.g. implementing a frequency dependent gain (e.g. it may implement a filter function). In some embodiments, the loop transfer function may be a filter implementing both the desired frequency response and gain factors and the feedback bath may simply be a flat unity gain feedback (e.g. corresponding to a feedback matrix representing the feedbacks having coefficients of one on the diagonal). In many embodiments, the feedback network may be represented by a feedback matrix having a coefficient for each feedback loop pair combination.

Feedback delay networks are typically based on feedback loops with different delays in them. Input signals are inserted in the loops and with appropriate feedback gains, the signals are fed back into the loops. Output signals are extracted by combining signals in the loops. Signals fed in are therefore continuously repeated with different delays. Using delays that are mutually prime and having a feedback matrix that mixes signals between loops can create a pattern that is similar to reverberation in real spaces, and is particularly suitable for generating diffuse reverberation as in the example of a Jot or other parametric reverberator.

The absolute value of the elements in the feedback matrix are designed to be below one in order to achieve a stable, decaying impulse response. The coefficients can be set in combination with the delays to achieve a desired reverberation time (T60). In many implementations, additional gains or filters are included in the loops. These filters can control the attenuation instead of the matrix. Using filters has the benefit that the decaying response can be different for different frequencies.

In the audio apparatus, such a feedback delay network may be used to generate the flutter echo audio signal, and in many embodiments a feedback delay network may be used to generate both the flutter echo audio signal and diffuse reverberation. In particular, the same feedback delay network may be used for both with the parameter values being determined to provide the desired effect. Specifically, when no flutter echo is to be generated, all feedback loops of the feedback delay network may be used to generate diffuse reverberation components and the parameters may be set accordingly. If a flutter echo audio signal is to be generated, one or more (typically only few, such as no more than two or three) feedback loops are used to generate the flutter echo audio signal and the remaining feedback loops are used to generate the diffuse reverberation signal. The reassigned feedback loops are then setup with suitable parameters for generating a flutter echo audio signal. In many embodiments, a total of e.g. 8-20 feedback loops may be provided with no more than three of these being used for generation of the flutter echo audio signal when appropriate.

As a specific example, the approach may provide a way to include flutter echo simulation using the existing structure of the feedback delay network in the parametric reverberator generating the diffuse reverberation. This may add further characteristic features of a room's acoustics to the set of simulation tools, providing a more realistic modelling of common rooms in a virtual rendering.

The feedback delay network may thus be common to the echo signal generator 509 and to the reverberator 507.

In the example of FIG. 7, the input signals are fed to each feedback loop via an input circuit comprising a pre-gain 701. The inputs of the feedback loops comprise combiners 703, which combine the input audio source signal with the signal(s) being fed back to the feedback loop. Each loop comprises a loop filter 705 (which may include a delay), the output of which are fed to a feedback network/matrix 707 which provides a feedback to the loop inputs. Further, an output circuit combines the output signals from the loops into an output signal. The output circuit specifically includes a set of gains 709 and a combiner 711 arranged to generate the output signals of the feedback delay network as a weighted combination of the output signals from the feedback loops.

The audio apparatus is arranged to adapt the flutter echo audio signal generation. In particular, in many embodiments, the audio apparatus may be arranged to adapt a degree or level of flutter echo dependent on the room properties of the simulated room, and indeed in many embodiments the audio apparatus may be able to adapt whether a flutter echo audio signal is generated or not depending on the room properties. Thus, the flutter echo simulation is not merely a static generation of a flutter echo audio signal that provides a flutter echo effect but is rather a dynamically adapted flutter echo generation that depends on room properties, and especially rather than always generating a flutter echo effect, this may in many embodiments only be done when it is determined that flutter echoes are likely to be significant in the specific room.

The audio apparatus comprises an estimator 405 which is arranged to determine a flutter echo estimate for the room based on the received room metadata. The flutter echo estimate is indicative of a level/degree/amount/prevalence of flutter echo in the room.

The exact approach and algorithm or function for determining the flutter echo estimate may differ between different embodiments and may depend on the exact performance and operation desired for the individual application. In many embodiments, the flutter echo estimate may be generated to be indicative of an increasing level of flutter echo for the room metadata being indicative of reflections between one pair of opposing boundaries/walls being higher than for other pairs of boundaries/walls. This may for example be the case if the pair of opposing walls are substantially further apart from each other than other pairs of opposing walls and/or if the combined reflection attenuation for the pair of opposing walls is lower than for other pairs of walls. In such cases, the echoes occurring between the pair of opposing walls may be substantially stronger than other reflection paths that occur between walls and this may lead to more significant flutter echoes (generated by the pair of opposing walls) relative to other reflections creating e.g. the diffuse reverberation. Specifically, these flutter echoes may decay slower than other reflections creating, e.g., the diffuse reverberation. This may lead to more significant flutter echoes after a certain amount of time after emission by the source, e.g. 30 ms.

The estimator 405 is coupled to an adapter 407, which is arranged to adapt a parameter of at least one of the feedback loops of the feedback delay network in response to the flutter echo estimate. In many embodiments, the parameter may be a feedback factor (which may be frequency dependent) for the loop to itself, a feedback factor (which may be frequency dependent) for the loop to another loop of the feedback delay network, a feedback factor (which may be frequency dependent) from another loop to this loop; a loop gain/weight, a loop delay, a loop transfer function, and/or an extraction coefficient/weight for generating an output signal.

In many embodiments, a common feedback delay network may be used for the generation of diffuse reverberation and for the generation of the flutter echo signal. In such cases, feedback loops may be dynamically allocated to be used either for diffuse reverberation generation or for flutter echo audio signal generation and this may be done by adapting the parameters of the loops to be suitable for the diffuse reverberation or for the flutter echo audio signal. Thus, in many embodiments, the adapter 407 may for at least one feedback loop be arranged to switch between parameter values for generating a diffuse reverberation signal to parameters for generating a flutter echo audio signal in response to the flutter echo estimate.

The audio apparatus is accordingly arranged to determine the degree of a flutter echo that is consider to be present in the room and may setup the feedback loops of the feedback delay network to generate a flutter echo audio signal corresponding to this flutter echo.

The approach may provide an improved acoustic simulation in many embodiments and may in particular provide more naturally sounding audio when simulating rooms having particular characteristics resulting in specific flutter echoes being significant, without sacrificing performance for rooms in which flutter echo may not be significant or even noticeable.

The main driving factor defining a reverberation response is a sound wave's traveled distance. It causes attenuation and delay. However, each reflection on a surface causes an additional attenuation without adding any delay. Therefore, repetitive reflections in a small room dimension decay faster than for a large room dimension. Flutter echo will decay faster in short room dimensions than in large ones The flutter-echo decay-rate is most often in line with the room's reverberation time T60, as the different dimensions of the room are roughly similar. This means the flutter echo is mixed with the other reflections that take different paths across multiple dimensions. These are causing a less regular reflection behavior. Due to the similar decay characteristics, the flutter echo will not be particularly noticeable in many situations and it is not considered for typical current approaches.

Figure 8:
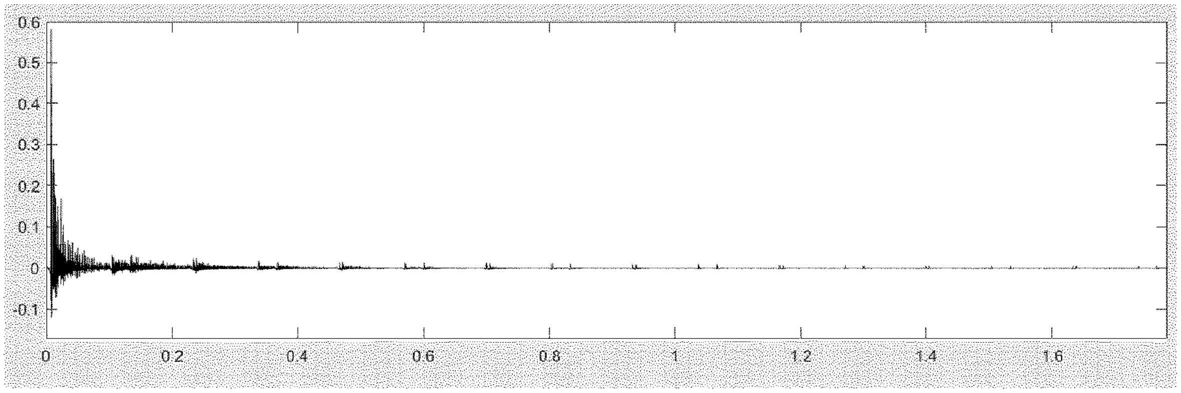
FIG. 8 illustrates an example of a room impulse response.

However, when one room dimension clearly deviates from the others by being much larger, there will be flutter echo in this dimension that deviates significantly from most of the reflection rates in the room. It will decay slower than the other reflection paths, because there will be less reflection interactions with the room boundaries. This makes it stand out from the rest of the reverberation, since fewer reflections result in less attenuation over time, and it accordingly becomes more audible. An example of a room impulse response showing flutter echoes is illustrated in FIG. 8 (example is of a corridor with dimensions of 40×2×2.5 m).

Similarly, flutter echo can stand out in the reverberation response when two parallel walls are significantly more reflective than other walls in the room. This makes the flutter echo in this dimension decay slower because each interaction with a wall is less destructive than in flutter echo in other dimensions and the reflection paths crossing multiple dimensions.

As described, flutter echo may result from the repetitive bouncing of a sound wave between two parallel surfaces. Such echoes tend to exist in all rooms, but stand out more in some rooms depending on their shape or their boundaries' relative material properties.

In the example, the estimator 405 may generate the flutter echo audio signal to reflect the difference in room dimensions. The room metadata may include dimension data for the room and the adapter 407 may determine the flutter echo estimate based on a room dimension in a first direction relative to a room dimension in a second direction. For example, the horizontal dimensions between the two parallel pairs of walls in a rectangular room may be determined from information of the size of the room indicated by the room metadata. The ratio of the longest dimension and the shortest dimension (or second longest dimension) may then be determined and used as an indication of how strong the flutter echo is. i.e. the ratio may be used directly as the flutter echo estimate.

The adapter 407 may then e.g. compare the flutter echo estimate in the form of the ratio to a threshold, and if the threshold is exceeded, it may configure some of the feedback loops of the feedback delay network to generate a flutter echo audio signal, and if it is below the threshold, it may instead configure the loops to contribute to the generation of the diffuse reverberation (and thus no flutter echo audio signal is generated). In other embodiments, a more gradual approach is used, such as for example by permanently using one or more feedback loops to generate a flutter echo audio signal, but with this having an amplitude that is a monotonically increasing function of the ratio/flutter echo estimate.

Alternatively or additionally, the adapter 407 may in some embodiments determine the flutter echo audio signal in response to variations in acoustic reflection attenuation for sides/boundaries/walls of the room. The room metadata may include acoustic reflection attenuation for walls of the room and the flutter echo estimate may be generated to reflect the variation of these. Specifically, the flutter echo estimate may be generated in response to a difference between a combined acoustic reflection attenuation for a pair of opposing sides of the room relative to a combined acoustic reflection attenuation for other pairs of opposing sides of the room. E.g. a ratio between such combined acoustic reflection attenuations may be determined and the flutter echo estimate may be generated directly as this ratio. The higher the difference, the higher the flutter echo estimate. As described for the dimension example, the adapter 407 may proceed to adapt the operation based on the ratio.

It will be appreciated that in many embodiments, the flutter echo estimate may be generated as a combination of different considerations and that specifically in many embodiments both room dimensions and acoustic reflection attenuations of the walls/sides of the room may be considered when generating the flutter echo estimate.

As mentioned, one potential cause for noticeable flutter echoes is a room with one deviating dimension being substantially longer than the other dimension(s), such as for a corridor. In such a case, the echoes of the two opposing walls in the deviating dimension will have longer path lengths that give rise to the flutter echo standing out from the rest of the Room Impulse Response (RIR). However, the reflecting paths fully orthogonal to the walls may be supplemented by reflection paths with additional reflections on the other boundaries in the short dimensions, but with the extension in the sideways direction being relatively small.

As a result, the path lengths of a significant portion of early reflections are dominated by the distance in the deviating dimension. This effect becomes stronger for higher reflection orders. If mirrored sources are spread e.g. by about 40 m in one dimension, a spread of e.g. about 4 m in another dimension does not add much more distance. Therefore, multiple reflections of different orders will be grouped close to each other in the RIR with only slightly different lags.

This means that flutter echo is not purely caused by a sound wave bouncing back and forth between two parallel surfaces. That effect just causes the first, and strongest, reflection of a sequence of reflections. More reflections may follow, representing one or more shallow, additional reflections on one of the long boundaries. These cause the clearly visible recurring bursts of concentrated energy in the RIR.

This may result in flutter echoes that are not only a single echo reflection but with each echo essentially including a sequence of compound reflections.

Figure 9:
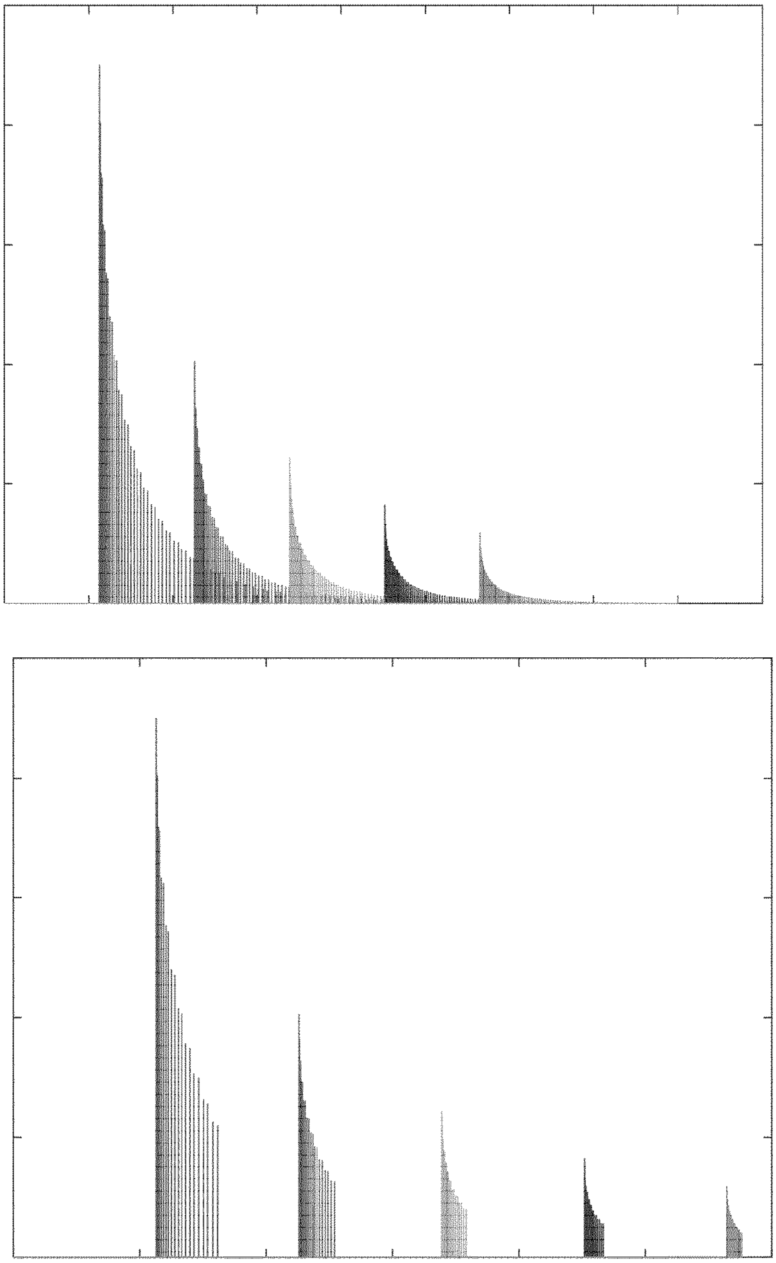
FIG. 9 illustrates examples of flutter echoes.

Towards higher orders of the main flutter echo, the other reflections with similar distances will become more densely compressed in time. I.e. the lengths of the paths that bounce once or twice on a long room boundary will be closer to the path length without reflections on the long boundaries than for lower orders. Examples of such compound flutter echoes are illustrated in FIG. 9 (which also show the temporal compression that may occur).

Working in the digital domain, this means that at some point multiple reflections contribute to the same (discrete) filter delay. Their contributions add up and make the impulse response amplitude of these bursts larger than what they would be with an infinite sample-rate.

In the specific example, the audio apparatus implements an approach for adding simulation of flutter echoes by using the existing framework of a parametric reverberator. The overall complexity of the audio apparatus may thus not change substantially.

The audio apparatus may base the operation on room metadata descriptive of:

room dimensions, locations and orientations of the room boundaries, and/or material properties related to the room boundaries.

Based on the metadata, the estimator 405 may first determine whether flutter echo is a likely audible acoustic property of the room where the user is located. For example, this may be considered the case when one dimension is significantly larger than the other two, or the reflective properties of the material on walls in one dimension are significantly larger than in the other. A flutter echo estimate may be generated that reflects this.

The adapter 407 may adapt the operation of the signal generator 403 in response to the flutter echo estimate. If this indicates that flutter echo is significant, the configuration parameters of the feedback delay network of the parametric reverberator are modified so that one or more of its feedback loops will model the flutter echo.

The adapter 407 may then proceed to set the loop delay to be proportionate to the room dimension in which the flutter echo occurs, the loop filter is set to correspond to the (combined) material properties of the walls involved with the flutter echo, and the feedback matrix may be adapted to isolate the loops from the remaining regular feedback loops. Thus, a number of parameters of the feedback loops may be set to emulate the flutter echo.

Thus, in some embodiments, a flutter echo estimate may be generated and evaluated to determine whether to simulate the flutter echo or not. It is only necessary when the flutter echo would be audible. Typically, there are two potential main root causes for audible flutter echo:

- a room dimension is significantly larger than the other two,
- the reflective properties of the material on walls in one dimension are significantly stronger than in the other two.

Also, combinations of the above could cause flutter. For example, when two dimensions are significantly larger than the third, but one of these is much less reflective than the other.

A room dimension may e.g. be considered significantly larger than the other two when it is twice as big as the maximum of the other two dimensions. An alternative criterion may be when one room dimension is at least 3.1 times as long as the average dimension of the other two dimensions. In some embodiments, it may be when a room dimension is at least 50% longer than the average of all three room dimensions.

If a room is not a rectangular cuboid (shoebox), the dimensions may be set to the outer limits of the geometry in all three dimensions.

Alternatively, a room may be eligible for flutter echo simulation if the material properties of room boundaries in one dimension are significantly different from those in other dimensions. The reflection may be represented by a parameter reflecting the acoustic reflection attenuation such as a reflection or absorption coefficient. For example, if the average reflection coefficient (a value between 0, non-reflective, and 1, fully reflective) of both walls in one room dimension is at least 0.2 higher than the maximum average reflection coefficient of both walls in the two other directions. Similarly, the average reflection coefficient of each wall pair may be compared to the average of all walls or the average of the two other wall pairs. For example, if the average reflection coefficient is at least 20% larger than the overall average. Additionally, a minimum required reflection coefficient may be introduced, e.g. the average reflection coefficient must be at least 0.67.

In other embodiments, absorption coefficients may be used to reflect the acoustic reflection attenuation, and these may be required to be smaller in the candidate flutter dimension than in the other dimensions. For example, an average absorption coefficient smaller than 85% of the average absorption coefficients of the wall pairs in other dimensions may be required.

Reflection (or absorption) coefficients are often frequency-dependent. They may be averaged over all frequencies or over a subset of frequencies. Additionally, averaging may happen over wall segments with different material properties.

Thus, a flutter echo estimate may be generated to reflect such parameters and the adapter 407 may determine whether to simulate the flutter echo or not based on whether the flutter echo estimate meets a suitable criterion.

The flutter echo estimate, and specifically deciding whether flutter echo will be simulated or not, may include a consideration of the combination of room dimension and material properties. E.g. either of separate criteria being met may cause flutter echo to be simulated. Other embodiments may only simulate the flutter echo when both a room dimension is significantly larger and the corresponding average material properties are significantly different. Optionally, or alternatively, the reflection coefficients of a candidate flutter dimension may additionally be required to be a minimum value.

In some embodiments, the dimension and material properties are combined into an estimated decay time (e.g. T60). If the estimated one dimensional decay time of one dimension is at least 30% longer than the maximum of the one dimensional decay times in the other two dimensions, flutter echo may be simulated in that dimension. In other embodiments the decay time may need to be at least 0.5 seconds longer than in the other dimensions.

The decay time can be estimated from the dimension and corresponding walls' average reflection coefficient. In the time it takes a sound wave to travel back and forth the room in that dimension, it attenuates due to the distance it traveled and two reflections on the walls. As an example, an estimated T60 decay time may be calculated according to:

$$T60_{est} = \frac{10^{\frac{60}{10}}}{\left(\frac{d_{ref}}{2 \cdot D} \cdot 2 \cdot \bar{r}\right)^2} \cdot \frac{2 \cdot D}{340}$$

This determines the attenuation in one back and forth path in the room dimension with size D. Using a source's reference distance $d_{ref}$ and the average reflection coefficient $\bar{r}$, the energy attenuation is calculated. It is referenced how many of those are needed to decay 60 dB, and multiplied by the time duration for traveling a distance of 2·D meters.

In other embodiments, estimated one-dimensional decay times may be compared to overall room decay times, e.g. if the one-dimensional T60 is 10% longer than that estimated for the entire room. Overall room T60 can be estimated with equations such as a Sabine or Norris-Eyring formula.

The decision whether flutter echo should be simulated may also be a soft decision. By, e.g., choosing a low threshold where flutter echo is likely just inaudible and a high threshold where the flutter echo is likely audible, any cases in between these thresholds would result in a confidence between 0 and 1. A weight w=0 corresponds to no audible flutter echo and w=1 corresponds to full confidence that flutter echo is audible.

For example, if the 1-dimensional decay time in dimension 1, $T60_{est}^{(1)}$, is compared against the average of all decay times in the room, there may be a threshold at 110% and at 150%, where below 110% there will be no flutter echo simulated, above 150% confidence is 1 and linearly increases from 0 to 1 in between the thresholds.

$$W = \begin{cases} 0 & \text{if } \frac{T60_{est}^{(1)}}{\frac{1}{3}\left(T60_{est}^{(1)} + T60_{est}^{(2)} + T60_{est}^{(3)}\right)} < 1.1 \\ \left(\frac{T60_{est}^{(1)}}{\frac{1}{3}\left(T60_{est}^{(1)} + T60_{est}^{(2)} + T60_{est}^{(3)}\right)} - 1.1\right) \cdot \frac{1}{1.5 - 1.1} & \text{if } 1.1 \le \frac{T60_{est}^{(1)}}{\frac{1}{3}\left(T60_{est}^{(1)} + T60_{est}^{(2)} + T60_{est}^{(3)}\right)} \le 1.5 \\ 1 & \text{if } \frac{T60_{est}^{(1)}}{\frac{1}{3}\left(T60_{est}^{(1)} + T60_{est}^{(2)} + T60_{est}^{(3)}\right)} > 1.5 \end{cases}$$

In some embodiments, the room characteristics may not directly be available but may e.g. be characterized by a Room Impulse Response. In some embodiments, the room metadata may include a RIR and the estimator 405 may be arranged to generate the flutter echo estimate in response to the RIR. In this example, the parameters of the feedback delay network may be determined from a flutter echo estimate generated from the RIR. Measuring impulse responses is more amenable to rooms with arbitrary shapes that deviate from a rectangular shoe-box model.

Figure 10:
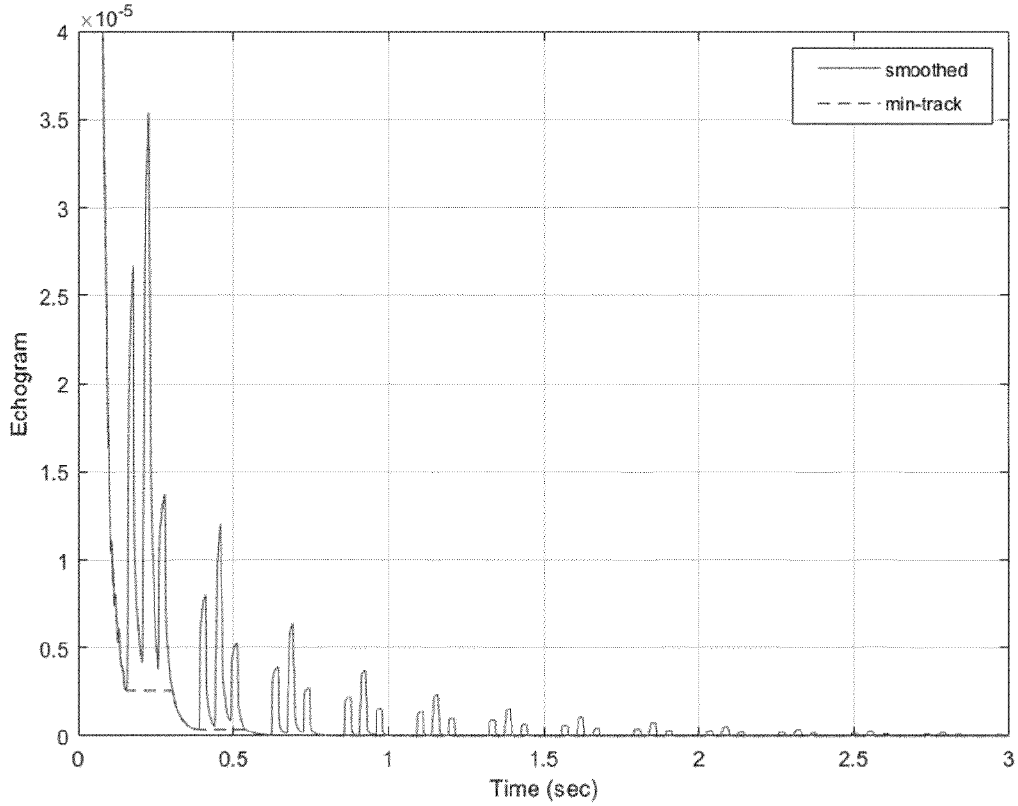
FIG. 10 illustrates an example of a room impulse response property.

In such an embodiment, the presence of flutter echo can be measured using a smoothed version of the magnitude squared IR ($e_{smooth}$(n)). By applying minimum tracking to the IR ($e_{min}$(n)), any flutter echo components may be isolated. This is because discernable flutter echo will decay more slowly than the remaining reverberant reflections, and tracking the minimum approximates the reverb decay envelope. An example of this is shown in FIG. 10.

Subtracting the two signals isolates the flutter echo components if any exist. If the energy of this signal exceeds a certain threshold, it may be determined that flutter echo is present. This decision may also be represented as a percentage of the reverberation, i.e.

$$w = \min\left(1, \frac{e_{smooth}(n) - e_{min}(n)}{e_{min}(n)}\right)$$

As another example, the difference between the two echograms, $e_{smooth}(n) - e_{min}(n)$, may be used to derive properties related to the delay and decay of the flutter echo, and used to configure the feedback delay network.

In some embodiments, a peak-picking algorithm can be used to extract local maxima and their timestamps. The decay rate of these echoes can be determined by fitting an exponential decay model to the peaks. Together, the decay rate, and timestamps can be used to determine parameters for the feedback loops.

The adapter 407 may be arranged to adapt parameters in different ways in different embodiments depending on the desired performance. The parameters for generating the flutter echo audio signal may be substantially different from the parameters used by feedback loops when generating diffuse reverberation.

The delays in a feedback delay network for generating reverberation are typically chosen relatively small, such that they create a fast build-up of reflection density. For example, an average of 12 ms is often used but for high bandwidth signals (e.g. 48 kHz) this is typically even smaller.

The choice of delay is often dependent on the reverberation time (T60). Although this is usually positively correlated with a room's dimensions, the material properties of the room boundaries also have a significant effect on the T60, i.e. the material properties introduce additional (in addition to attenuation caused by distance attenuation) attenuation to the RIR without adding latency, and the room dimensions determine the rate at which these attenuations occur in the RIR. Hence, the configuration of parametric reverberators is mainly determined by the overall reverb property, T60, and the desire to quickly reach a minimum reflection density to accurately model a room (for example: 1,000-10,000 reflections per second).

In contrast, when a feedback loop is configured to generate the flutter echo audio signal, the adapter 407 may select a loop delay that corresponds to the room dimensions in order to simulate the rate of the flutter echo. The loop filter that normally simulates the overall reverb slope, T60, may instead be chosen to correspond with the average material properties of the walls involved with the flutter echo to simulate the effect of the walls at each reflection.

The feedback matrix may in many embodiments be adjusted to keep the flutter echo separate from the diffuse reverb generation, so that the consistent recurrence of the flutter echo is simulated. If multiple different flutter echoes exist in a room, multiple feedback loops can be repurposed in a similar fashion.

In many embodiments, the adapter 407 may be arranged to increase a feedback factor/gain from the first feedback loop to itself for the flutter echo estimate being indicative of an increasing level of flutter echo. For an increasing degree of flutter echo, the feedback from a given feedback loop to itself may be increased. Alternatively or typically additionally, the adapter 407 may be arranged to decrease a feedback factor from the first feedback loop to a second feedback loop of the plurality of feedback loops for the flutter echo estimate being indicative of an increasing level of flutter echo. The second feedback loop may be a feedback loop that is not configured to be used for flutter echo generation but instead is used for generation of diffuse reverberation.

In some examples, a feedback loop used for generating a flutter echo may only feedback to itself. In some examples, a feedback loop used for generating a flutter echo may not feedback to any other feedback loop configured to generate a flutter echo. In some examples, a feedback loop used for generating a flutter echo may only receive a feedback signal from itself (out of the set of feedback loops used for generating the flutter echo or possibly out of all feedback loops of the feedback delay network).

The adaptation may for example be a gradual adaptation but in other embodiments the adaptation may for example be a step function. For example, if the flutter echo estimate is indicative of the flutter echo not being significant, a suitable feedback factor may be relatively low as the feedback loop may be mainly used to contribute to the diffuse reverberation in which case the feedback from a given loop is increasingly distributed to different loops to reflect the many different reflections making up the diffuse echo. However, if the flutter echo estimate indicates that flutter echo is significant, the feedback factor of the loop may be increased and the feedback factor to other loops may be reduced to reflect an increasing amount of periodic reflection corresponding to a typical flutter echo.

Some examples of the adaptation may be described below with reference to the example of FIG. 11 which illustrates an example of a flutter echo as a function of time and space. In the example, the flutter echoes originating at a source 1101 reach the listener 1103 at a fixed rate corresponding to two path lengths between the walls 1105, 1107

$$\left(\tau_r = \frac{2D}{c},\right.$$

with D being the distance between the walls and c being the speed of sound), but with four different offsets, depending on where the user and source are between the walls.

In some low complexity embodiments, the audio apparatus may simplify this by repurposing only a single reverberator loop, using a delay corresponding to a single path-length between the walls $$\left(\tau_r' = \frac{D}{c}\right).$$

This corresponds with the listener and source being in the middle of the room where both the dotted- and the solid line reflections reach the listener simultaneously at a fixed rate.

The feedback matrix for a reverberator with N loops, using the first loop for the flutter echo could be defined as:

$$A_{d+f}^{(N)} = \begin{bmatrix} 1 & 0 & \cdots & 0 \\ 0 & & & \\ \vdots & & A_d^{(N-1)} & \\ 0 & & & \end{bmatrix}$$

where $A_d^{(N-1)}$ is a regular feedback matrix for diffuse reverb modelling only on N−1 loops. The reverberator's T60 filter (or loop filter) in the flutter loop may simulate the average reflection characteristics of the walls. For example:

$$H_{\tau_r'}(z) = G_d(D) \cdot \left(\overline{M_1}(z) + \overline{M_2}(z)\right)$$

where $G_d(x)$ is a function that returns the distance attenuation for a path length of x meters, which might be a frequency dependent attenuation, $\overline{M_1}(z)$ is the average reflection coefficient of wall 1, and $\overline{M_2}(z)$ of wall 2, which are typically frequency dependent. Thus, the loop filter now simulates the attenuation resulting from the sound wave propagating through the medium (e.g. air), and the reflection on both walls.

The function $G_d(x)$ provides distance attenuation for a sound-wave propagating x meters. This can be a simple attenuation based on an omnidirectional source where its energy is spread over a sphere with radius x. It is well known that every doubling of the distance (i.e. radius) causes a 6 dB attenuation. In many embodiments a reference distance may be used as the distance for which the source signal is defined, where the distance attenuation is considered to be included in the signal and for which the additional distance attenuation from $G_d(x)$ equals 0 dB.

Additionally, other aspects may be added to $G_d(x)$, such as the effect of air absorption $G_{abs}(x)$. This effect typically becomes more significant at greater distances, and tends to be frequency-dependent. Typically, the effect of air absorption is quite small, especially when considered for realistic room dimensions D.

$$G_d(x) = \frac{d_{ref}}{x} \cdot G_{abs}(x)$$

The described embodiments may use $\overline{M}(z)$ to denote average reflection coefficients. Material properties may be defined in various ways. For example, material properties may include absorption-, specular- reflection-, diffuse-reflection-, transmission- and/or coupling coefficients. In some embodiments, it may be only reflection and absorption, where they must add up to one. In most embodiments, the specular reflection coefficients may be most relevant for flutter echo simulation. $\overline{M}(z)$ may often be calculated by weighing reflection coefficients with their surface ratio of one or more patches in the wall for which the average reflection coefficients are calculated. For example, a 12 $m^2$ wall of interest may be 10 $m^2$ concrete wall with a 2 $m^2$ wooden door. Then the concrete reflection coefficient will be included with a weight of 10/12 while the wood reflection coefficient will be included with a weight of 2/12.

Reflection coefficients may not be averaged but may e.g. be adapted to the lateral position of the source in front of the wall, i.e. where most of the flutter echoes will occur. In such embodiments, multiple sources may be grouped in separate loops according to their associated reflection coefficient.

Figure 11:
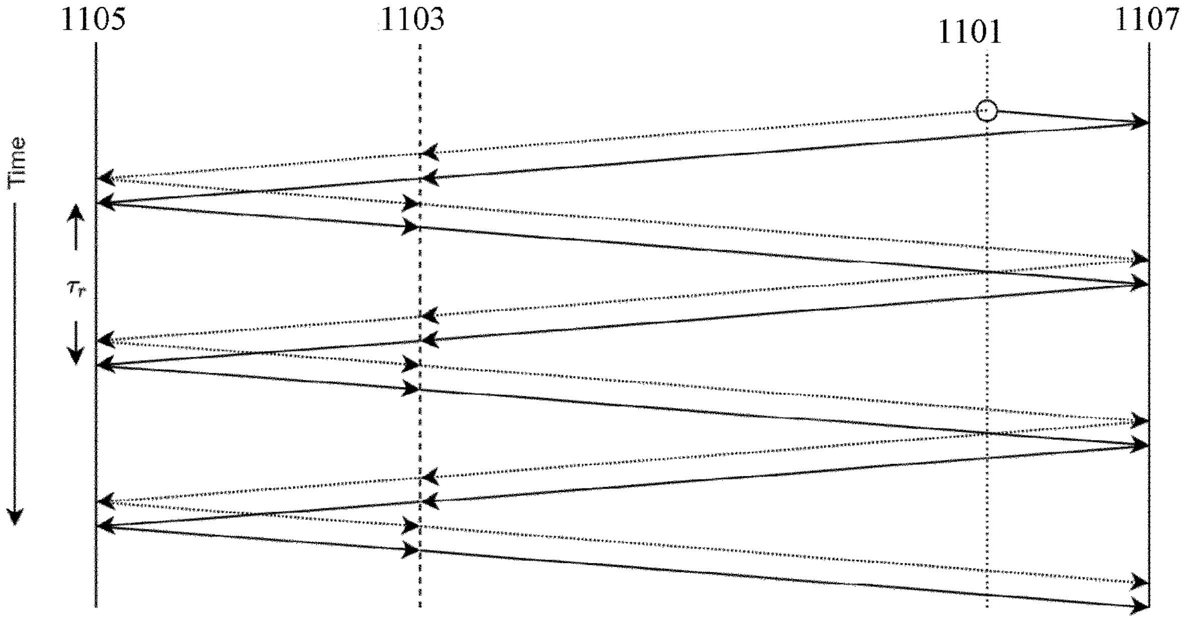
FIG. 11 illustrates an example of a flutter echo between two opposing walls.
Figure 12:
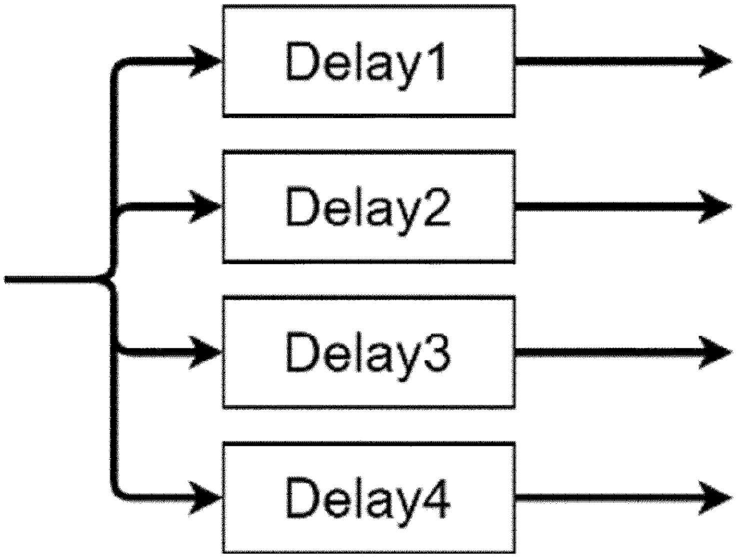
FIG. 12 illustrates an example of circuitry for a signal generator for generating an audio signal in accordance with some embodiments of the invention.

As another example, the audio apparatus may be adapted to use four isolated loops with delays corresponding with the double path length ($\tau_r$) when emulating the flutter echo of FIG. 11. The four loops may have separate inputs which have been pre-delayed to reflect the offsets between the listener/source and the walls. A pre-delay circuit such as illustrated in FIG. 12 may e.g. be used.

The feedback matrix in this case could be defined as:

$$A_{d+f}^{(N)} = \begin{bmatrix} 1 & 0 & 0 & 0 & 0 & \cdots & 0 \\ 0 & 1 & 0 & 0 & 0 & \cdots & 0 \\ 0 & 0 & 1 & 0 & 0 & \cdots & 0 \\ 0 & 0 & 0 & 1 & 0 & \cdots & 0 \\ 0 & 0 & 0 & 0 & & & \\ \vdots & \vdots & \vdots & \vdots & & A_d^{(N-4)} & \\ 0 & 0 & 0 & 0 & & & \end{bmatrix}$$

where the first four loops are dedicated to the flutter echoes.

The reverberator's loop filters in the flutter loop would both simulate the average reflection characteristics of the walls. For example:

$$H_{\tau_r}(z) = G_d(2 \cdot D) \cdot \left(\overline{M_1}(z) + \overline{M_2}(z)\right)$$

Thus, each loop filter now simulates the attenuation resulting from the sound wave propagating through the medium (e.g. air) twice the wall-to-wall distance, and the reflections on both of the walls.

The advantage of this embodiment is that it simulates the asymmetry in the two loops similar to how it would be in a real room. Adjusting the pre-delay can be used to adapt the asymmetry to the user's position in the room, without having to update the parameters of the feedback delay network itself.

For example, if the listener is 30% of the wall-to-wall distance from wall 1101 and the source 15% of the wall-to-wall distance from wall 1102, the pre-delays could be set as follows:

$$Delay1 = \frac{0.55 \cdot D}{c}$$

$$Delay2 = \frac{0.85 \cdot D}{c}$$

$$Delay3 = \frac{1.15 \cdot D}{c}$$

$$Delay4 = \frac{1.45 \cdot D}{c}$$

based on the four first path-lengths from the source to the listener. Alternatively, the delays may be minimized to only reflect the path length differences, i.e., $$Delay1 = 0$$

$$Delay2 = \frac{(0.85 - 0.55) \cdot D}{c}$$

$$Delay3 = \frac{(1.15 - 0.55) \cdot D}{c}$$

$$Delay4 = \frac{(1.45 - 0.55) \cdot D}{c}$$

Figure 13:
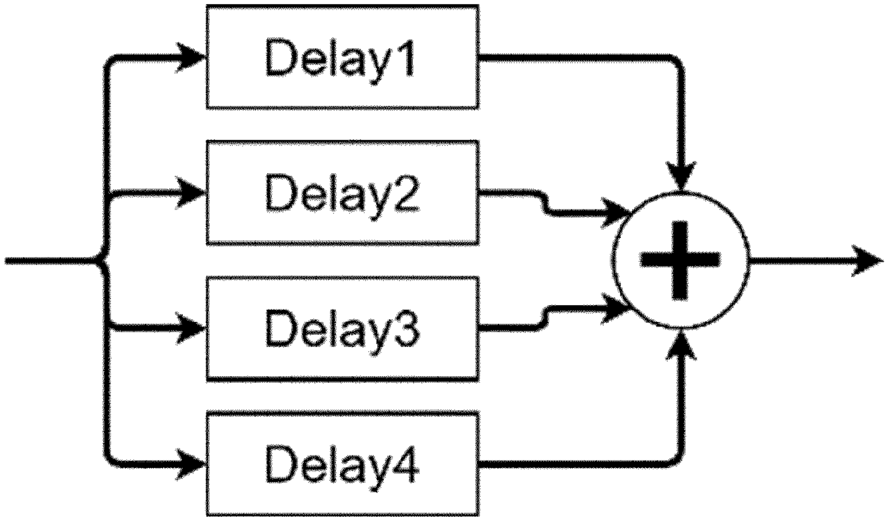
FIG. 13 illustrates an example of circuitry for a signal generator for generating an audio signal in accordance with some embodiments of the invention.

The previous embodiment may in some cases be simplified by combining the pre-delayed signals prior to feeding the combined signal to a single feedback loop, as e.g. illustrated in the example of FIG. 13.

The feedback matrix may be:

$$A_{d+f}^{(N)} = \begin{bmatrix} 1 & 0 & \ldots & 0 \\ 0 & & & \\ \vdots & & A_d^{(N-1)} & \\ 0 & & & \end{bmatrix}$$

And the loop filter would be the same as in the previous embodiment:

$$H_{\tau_r}(z) = G_d(2 \cdot D) \cdot \left(\overline{M_1}(z) + \overline{M_2}(z)\right)$$

The loop simulates the path-length attenuation and reflections on two walls, but the pre-delay structure takes care of generating the offsets within the signal. Delays would be the same as in the previous example.

The pre-delay structure can also be extended to include gains or filters simulating the distance attenuation and reflections off the walls in these first paths. Such filters could also include additional filtering and/or attenuation simulating earlier propagation and reflections of the flutter echo, as the simulation in the feedback loops are not representing the first few reflection orders. However, such effects are typically already incorporated in the regular reverb pre-mixing and its coloration filters.

The separate input signal may also be obtained from a single tapped delay line. Typically, a parametric reverberator used in combination with direct path rendering and early reflections rendering includes a pre-delay for its normal operation, controlling where the reverb starts in relation to the direct path and early reflections. If this pre-delay is long enough, the delay buffer could be used as the tapped delay line. In this case, the flutter echo would start earlier, but this could be compensated in the early reflections modelling.

As another example, a set of feedback loops comprising two interacting loops, causing the signal to swap loop on every iteration, may be used. Using the following feedback matrix would achieve this in the first two loops.

$$A_{d+f}^{(N)} = \begin{bmatrix} 0 & 1 & 0 & \ldots & 0 \\ 1 & 0 & 0 & \ldots & 0 \\ 0 & 0 & & & \\ \vdots & \vdots & & A_d^{(N-2)} & \\ 0 & 0 & & & \end{bmatrix}$$

The delays in this embodiment could be set for an arbitrary listener position to create a regular but non-symmetric pattern that is more in line with realistic scenarios. Alternatively, the delays could be adjusted according to the user's position between the walls. For example, if the user is 30% of the wall-to-wall distance from wall 1101, a first delay could be $$\tau_{r1} = \frac{2 \cdot 0.3 \cdot D}{c}$$

and a second delay could be $$\tau_{r2} = \frac{2\cdot(1-0.3)\cdot D}{c}.$$

Similar to the previous embodiment, a pre-delay structure can be used to create the missing offset due to the signal bouncing in two directions. This could be done with two delays corresponding with the first two paths (Delay 1 and Delay 2 in the above).

A particular advantage of this approach is that the two loop filters can simulate each wall separately. I.e. a first filter related to the first delay $\tau_{r2}$ would have a frequency response:

$$H_{r1}(z) = G_d(2\cdot 0.3\cdot D)\cdot \overline{M_1}(z)$$

Similarly, a second filter associated to the second delay $\tau_{r2}$ would have a frequency response:

$$H_{r2}(z) = G_d(2\cdot(1-0.3)\cdot D)\cdot \overline{M_2}(z)$$

where $\overline{M_2}(z)$ is the average reflection coefficient of wall 2, which is typically frequency dependent.

A possibility with such embodiments is that, when the flutter loops are excluded from the regular extraction matrix to generate the diffuse reverb tail, they can be extracted to separate outputs for rendering with dedicated HRTF pairs.

In some embodiments, the signal generator 403 comprises a gain for the audio source signal prior to being fed to the feedback loop(s) of the feedback delay network and the adapter 407 is arranged to adapt the gain in response to a position for an audio source for the audio source signal. This may specifically, but not necessarily, be combined with the pre-delays previously described, and specifically each delay of the circuits shown in FIGS. 12 and 13 may include an adaptable gain which may be adjusted by the adapter 407 based on the position of the audio source, the listener and/or the walls.

The received data may include the audio signal representing the audio source as well as a position of the audio source and this position may be used to adapt the gain. Specifically, the gain may be adapted based on the position of the audio source relative to a wall/boundary/side of the room. Typically, the gain may be adapted based on a distance from the audio source to a wall (typically a nearest wall) being a reflecting wall for the flutter echo. The pre-gain may be used to adapt the relative strength/level of the overall flutter echo effect, and may specifically be used to adapt the level to reflect the strength of the signal when first being reflected.

In some embodiments the pre-gain may be adapted based on a distance of a listener/user. Specifically, the relative distance from the listener to the source or the distance from the source to the listener via at least one reflection on a reflecting wall for the flutter echo.

Further, in many embodiments, the first reflections may be represented by the early reflection simulations and the flutter echo signal generator 403 may only be used to represent further reflections of the flutter echoes. For example, the flutter echo signal generator 403 may be used to generate flutter echo components corresponding to the fourth or later reflections. In such cases, the sound being reflected has already been attenuated by the previous reflections including both the distance attenuation and reflection attenuation. Such effects may alternatively or additionally be represented by the pre-gain.

In some embodiments the adapter 407 may be arranged to adapt the gain in response to a distance between two walls/sides/boundaries of the room (and specifically walls/boundaries/sides that cause the flutter echo). In some embodiments the adapter 407 may be arranged to adapt the gain in response to an acoustic reflection attenuation for at least one wall/side/boundary of the room (and specifically a wall/boundary/side that causes the flutter echo). In some embodiments, the adapter 407 may be arranged to adapt the gain in response to a number of initial flutter echo reflections not emulated by the set of feedback loops of the feedback delay network allocated to flutter echo simulation.

Specifically, the (distance) gain component of the loop-filter may represent attenuation with respect to the adjustment in a previous loop pass (reflection), and the pre-gain may be used to adapt the input signal level, i.e. the level at the onset of reflections that are being simulated.

Signals may often be represented at a level corresponding to a certain reference distance. Before inserting the signal into the loop(s), a compensation/pre gain may specifically be employed to match the signal's level to the distance it has already travelled, i.e. to represent the initial distance gain. For example, the feedback delay network-based simulation may be configured to represent the flutter echo from its $4^{th}$ order (because the first three are represented by early reflections modelling by another algorithm). In this particular example, with reference to FIG. 14, the input gain may be:

$$G_{in} = \frac{d_{ref}}{3\cdot D}\cdot(\overline{M_1}+\overline{M_2})^3$$

where the two occurrences of the number 3 represent the three previous iterations, $\overline{M_1}$ the average reflection coefficient of wall 1105 (which may or may not be frequency dependent), and $\overline{M_2}$ the average for 1107, being summed with the material properties of wall 1 to represent both paths in one flutter loop with delay $$\tau_r = \frac{D}{c}.$$

A feedback loop may have an overall loop gain set to reflect attenuation of a reflection path (which dependent on the specific approach may include one or more reflections). The loop gain may be set by the loop filter and/or the feedback factor (the feedback matrix). In the described examples, the feedback factor for a loop to itself is set to one and the loop gain (less than 1) is determined by the loop filter. The loop gain/attenuation are typically frequency dependent, and the frequency dependency is typically implemented by the use of a suitable loop filter.

Different approaches for determining a loop gain/attenuation $G_d$ may be used in different embodiments.

Typically, the loop filter(s) include two main components: material properties (for example a reflection coefficient) and a distance-related gain. Each loop filter may represent one or more reflection coefficients corresponding to reflections on one or two walls and a distance gain corresponding to a travelled distance consistent with the reflections represented by the average reflection coefficients.

Because the loop-related distance with respect to the reference distance keeps increasing, the required distance attenuation component should become less strong with every iteration. E.g.:

$$G_d(x) = \frac{d_{ref}}{x} \cdot G_{abs}(x)$$

where x becomes larger with every iteration.

This means that consecutive reflections decay faster than exponentially, and that this may sometimes not be accurately simulated with a single feedback loop. The filters in the feedback loops may be constant due to the recursive character. Any processed sample may include components of many different iterations.

Isolating the energy dispersion component (the most significant component), distance attenuation (for signal amplitudes) is:

$$\frac{d_{ref}}{d}.$$

Say that every iteration corresponds with a travelled distance D. With every iteration, the distance d increases with this fixed distance D, which makes the additional attenuation with respect to the previous iteration be:

$$g_d = \frac{\frac{d_{ref}}{d+D}}{\frac{d_{ref}}{d}} = \frac{d}{d+D}$$

The problem is that d is increasing every iteration, and a fixed gain per iteration is needed. Representing the distance differently, where d is a multiple of D, we get a similar result that shows a further simplification:

$$\frac{\frac{d_{ref}}{n*D}}{\frac{d_{ref}}{(n-1)*D}} = \frac{(n-1)*D}{n*D} = \frac{n-1}{n}$$

Figure 15:
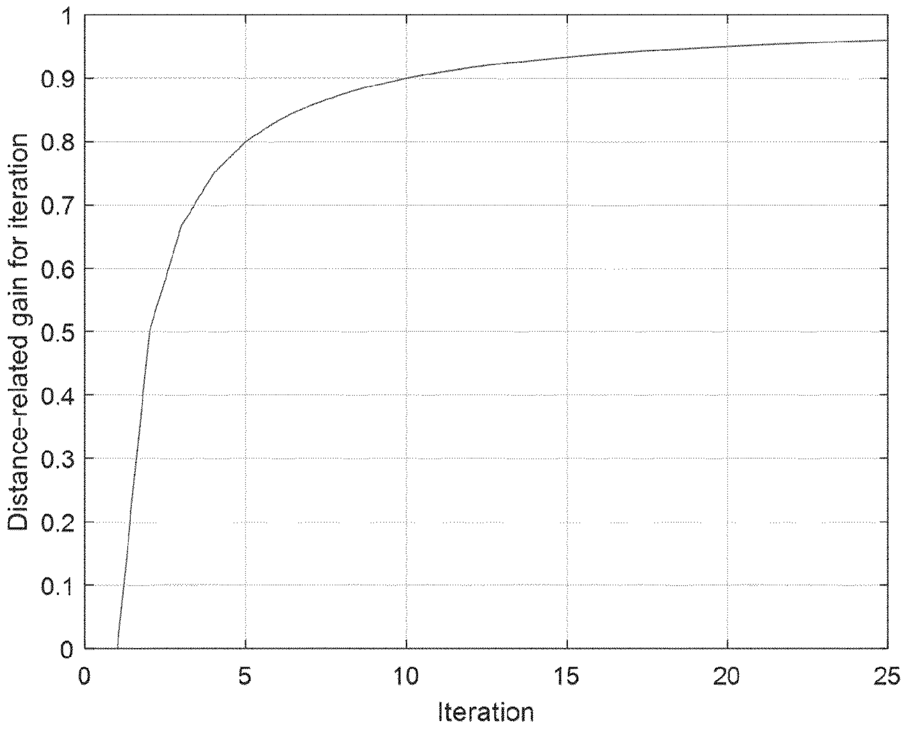
FIG. 15 illustrates an example of a distance gain as a function of a number of reflections between walls.

It can be seen that the effect of distance attenuation in each iteration is not so much dependent on the actual distance travelled, but the increase relative to what has already been travelled (in line with the rule-of-thumb that attenuation is 6 dB for every doubling of the distance). FIG. 15 shows how the distance gain may change per iteration.

The distance gain in the first iterations has quite a big impact, since the distance corresponding with one iteration is relatively small compared to the overall travelled distance. Quickly, the dynamic effect of the distance attenuation in each iteration reduces (i.e. changes less between iterations). As a result, the decay approaches an exponential shape.

With the distance gain approaching 1, the per-iteration gain stabilizes towards the average reflection coefficient of the flutter boundaries' material properties. Simulating the flutter echo, different embodiments may choose different approaches. For example, the average reflection coefficient may be chosen to simulate the decay at higher orders. Alternatively, a steeper decay may be used to simulate the decay at lower orders. Or a value in between may be beneficial in most implementations so as to not have a decay that is too steep or too shallow. Accurate simulation of the slope at high orders may in many cases be unnecessary because it will be inaudible to the listener. A good trade-off may be made by choosing the slope corresponding with, for example, the $5^{th}$ iteration.

As discussed above, many embodiments may adjust the input level of the signals that are inserted into the flutter loop. In addition to the compensation for reference distance, and reflection orders simulated differently, the input gain may be beneficially adjusted to the trade-off chosen for the attenuation gain $G_d$. Choosing a relatively slow decay may cause the flutter echo to be too pronounced, while choosing a relatively steep decay, the flutter may not be audible anymore where an accurate simulation would be.

With a relatively slow decay configured, the initial level may therefore be further lowered to avoid it being too pronounced. The additional attenuation essentially compensates for the faster decay at early iterations that are not accurately modelled in the recursive process. As a result, the stronger first reflections may not be accurately modeled. In many cases, these would have been (largely) masked by the reverberation anyway.

Figure 14:
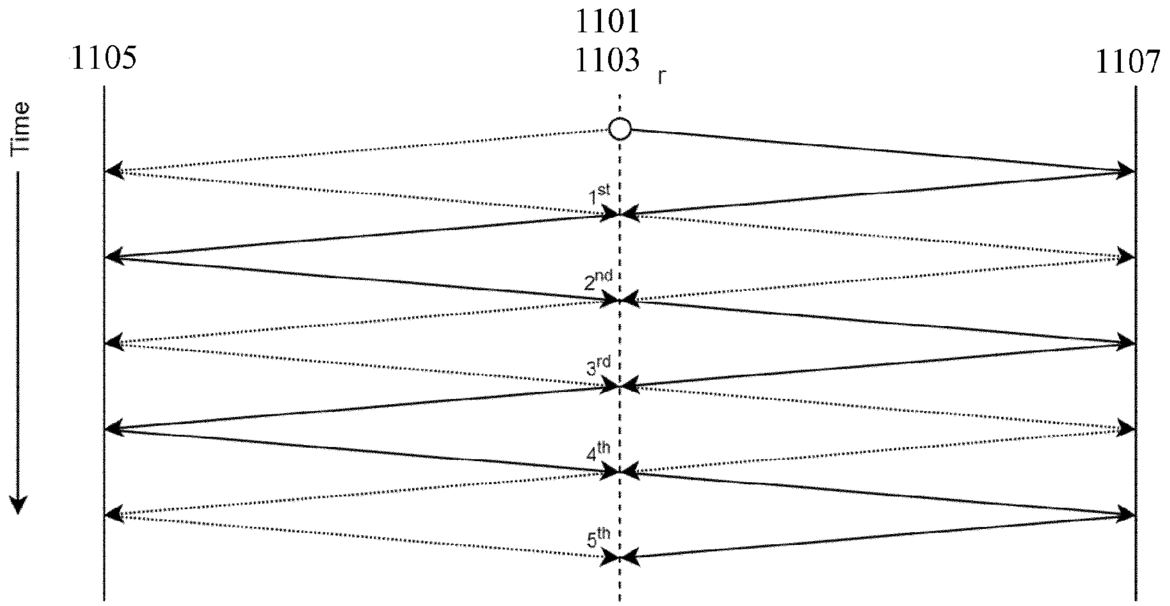
FIG. 14 illustrates an example of a flutter echo between two opposing walls.

As an example, based on the model from FIG. 14, a feedback delay network may be used to simulate the flutter echo from the second order onwards, using the decay slope corresponding to the $10^{th}$ iteration, resulting in the loop-filter to be:

$$H_{\tau_r}(z) = \frac{10}{10+1} \cdot (\overline{M_1} + \overline{M_2})$$

The initial input gain may be configured to represent the first reflection order:

$$G'_{in} = \frac{d_{ref}}{D} \cdot (\overline{M_1} + \overline{M_2})$$

The compensation for the missed attenuation in the first I=9 iterations may be included according to:

$$G_{in} = G'_{in} \cdot \frac{\prod_{i=1}^{I} \frac{i}{i+1}}{\left(\frac{(I+1)}{(I+1)+1}\right)^I}$$

where $$\prod_{i=1}^{I-1} \frac{i}{i+1}$$

represents the cumulative effect of the attenuations in the first I=9 iterations according to ideal modelling, excluding the material properties, whereas $$\frac{(I+1)}{(I+1)+1}$$

represents the attenuations that will actually be applied using the slope corresponding to I+1=10, excluding the material properties. The material properties can be excluded because they are present equally in both elements of the fraction.

This compensation ensures a match of both slope and level at the $10^{th}$ iteration. It can be stored for different decay reference iterations J in a look-up table.

$$LUT_J = \frac{\prod_{i=1}^{J-1} \frac{i}{i+1}}{\left(\frac{J}{J+1}\right)^{J-1}}$$

In some cases, the level may not need to be matched to the same iteration and a trade-off may be used:

$$G_{in} = G'_{in} \cdot LUT_J^{\alpha}$$

where α is the trade-off parameter with a value between 0 and 1. A value of 1 means a compensation as described above and a value of 0 results in no compensation.

In some applications, both the low order reflections with higher levels as well as the lower levels for medium- and higher order reflections are preferred to be simulated. This could be possible in rooms with relatively low diffuse reverb energy (e.g. highly absorbent boundaries, except those involved in the flutter echo). Such applications can employ an embodiment where two or more loops simulate different decay rates with the same delays.

If the delay on the input signals and inside the flutter feedback loops are equal, the reflections are created at the same time lags. A first flutter loop may be configured with a steep decay and a relatively large input gain, while a second flutter loop may be configured with a slow decay and a relatively small input gain. When the two are combined by the output circuit, the joint effect may more closely resemble an accurate simulation with iteration-dependent loop gains.

In some embodiments, the set of feedback loops allocated to generate the flutter echo may accordingly comprise at least two feedback loops that have different loop gains. However, the at least two feedback loops may have the same delay.

The above embodiments configure the loop filters according to the material properties of the walls between which the flutter echoes occur. These filters can be extended to include the effects of the shallow reflections on the long room boundaries.

The material properties of the boundaries in the flutter dimension (the short boundaries) do not have an impact on the energy ratio of the first reflection with respect to the overall compound reflection. However, it does impact how fast consecutive compound reflections decay.

Conversely, the material properties of the long boundaries (i.e. not along the flutter dimension) determine how quick each individual compound reflection decays, and hence the energy ratio between the first reflection and the overall compound reflection. The decay of the first response amplitudes in consecutive compound reflections are not affected by this material.

As described, within the RIR, these responses will change with the order of the flutter echo they contribute to, compressing the individual reflections in time. However, essentially there are additional contributions with one, two or more additional material properties. The main effect is that this increases the energy in the individual flutter echo and its coloration. The coloration is affected by adding contributions with additional frequency dependent material properties, but in theory also due to the delayed reflections causing comb-filter effects. However, due to the many repetitions at different delays, the comb-filter effect is not substantial.

The compound reflections may be modelled by a single reflection. The loop filter $H_\tau$ can be set to represent a single pulse with the spectral response matching that of a compound reflection.

The net effect of the compound reflection also constitutes a larger energy than a single reflection, this total energy should also be represented in the single reflection. Due to the delays the amplitudes of the individual responses typically do not add up coherently.

The energy of the compound reflection can be approximated by:

$$E_c = P^2 + \sum_{k=1}^{K} 4 \cdot P^2 \cdot (\overline{M_L})^{2k}$$

where K may be infinity or limited to a certain duration after the direct response, e.g. 50 ms. Typically, higher K's don't contribute significantly due to the exponential behavior. $\overline{M_L}$ is the average material reflection coefficient for the long boundaries combined. In this example $\overline{M_L} = \frac{1}{4} \cdot (\overline{M_3} + \overline{M_4} + \overline{M_5} + \overline{M_6})$. P is the amplitude of the first response in the compound reflections.

The above equation for $E_c$ ignores the distance attenuation. This contribution is relatively low. It also makes the energy ratio between initial amplitude and compound reflection energy independent of the flutter order.

In an alternative embodiment, a separate loop with a very short delay can simulate the tails to the main flutter response. This loop is only fed by the main flutter loop(s) and has no direct signal input ($b_i=0$), but does feedback into itself. The short delay could be dependent on the shortest dimension of the room. The attenuation by the filter would be the average reflection coefficient if the long room boundaries (e.g. $\overline{M_L}$).

Another alternative is to use a sparse IIR as the loop filter in the flutter loop that simulates the fast decaying response of the compound reflection.

In many embodiments, the audio apparatus may be arranged to feed a plurality of audio source signals to the feedback delay network, and specifically may be arranged to feed a plurality of audio source signals to the set of feedback loops that generate the flutter echo audio signal. The audio apparatus may for example receive audio source signals for a plurality of audio sources in the room and a plurality (and possibly all) of these signals may be fed to the set of feedback loops generating the flutter echo audio signal. The plurality of signals may for example be combined into a combined signal, which may then be fed to the set of feedback loops. Each signal may be subjected to a delay and/or gain adjustment prior to being combined with other signals. The gain and/or delay for each signal may for example be adapted to reflect an initial and/or relative signal level and/or arrival time for the individual signal (relative to other signals). In some embodiments, e.g. the gain and/or delay may be common for some or possibly all source signals fed to the set of feedback loops.

The previously described embodiments may allow accurate simulation of the offsets between individual reflections. This may provide a particularly realistic rendering. The described approaches have focused on generating flutter echo for a single source and the loop parameter properties etc. may depend on specific characteristics of the source, such as the position. However, often there are more than one source in a simulated room that generates a flutter echo. In such cases, each source may be simulated by its own, dedicated feedback loop(s) etc. These could be implemented with separate parallel paths to e.g. the pre-mixing and pre-delay prior to the feedback delay network.

Figure 16:
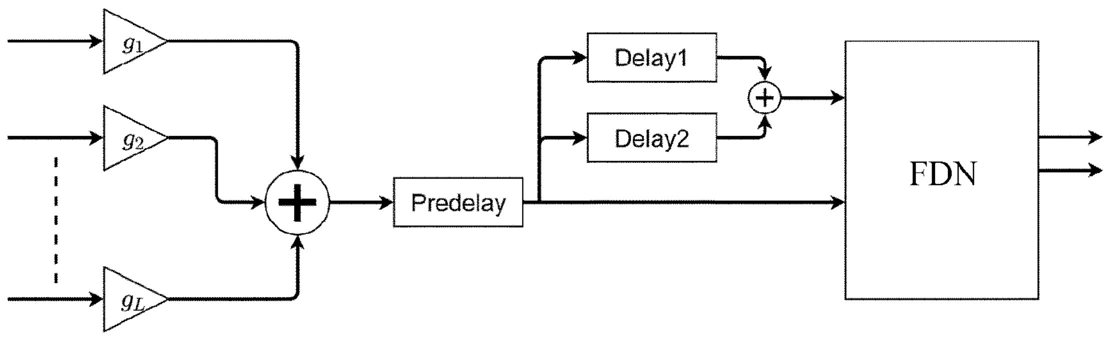
FIG. 16 illustrates an example of circuitry for a signal generator for generating an audio signal in accordance with some embodiments of the invention.

In many applications, such a level of accuracy is however not required. The parameters may be set to suitable values (e.g. arbitrarily or artistically chosen values). In some embodiments they may be chosen equally for all simulated sources. For example, the approach illustrated in FIG. 16 may be used where individual gains $g_n$ are applied to the input audio source signals before these are combined and with one or more delays then being applied to the common signal. This results in a lower computational and architectural complexity. In such an approach, the flutter echo audio signal may still be adapted to the user's position in the room.

The input to the feedback loops of the feedback delay network may be mathematically expressed as:

$$X_L = b \cdot x = \begin{bmatrix} b_1 \\ b_2 \\ \vdots \\ b_P \end{bmatrix} \cdot x$$

where x is an audio source signal (a mono signal) and $X_L$ the output signal vector corresponding to the P signals to be injected into the P feedback loops.

Some embodiments require or benefit from separate inputs to the feedback loops. This can be achieved by extending the input gain vector b to a matrix B that takes into account more than one signal and maps it to the different loops.

For example, the inputs provided to a feedback delay network with five feedback loops (P=5), could be processed by an input matrix B:

$$X_L = B \cdot \begin{bmatrix} x_1 \\ x_2 \end{bmatrix} = \begin{bmatrix} G_{in} & 0 \\ 0 & 1 \\ 0 & 1 \\ 0 & 1 \\ 0 & 1 \end{bmatrix} \cdot \begin{bmatrix} x_1 \\ x_2 \end{bmatrix}$$

where $x_1$ is the first input signal, $x_2$ the second, and the first feedback loop is a feedback loop used for flutter echo generation and with the remaining four feedback loops being used to generate diffuse reverberation.

Figure 17:
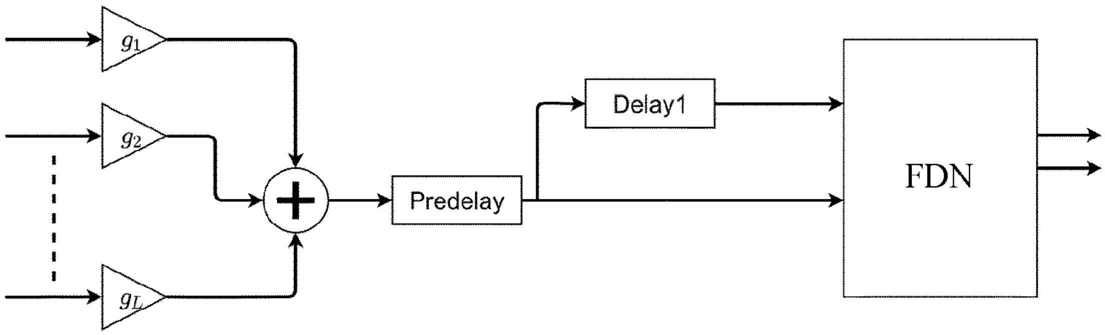
FIG. 17 illustrates an example of circuitry for a signal generator for generating an audio signal in accordance with some embodiments of the invention.

Alternatively, in line with FIG. 17, an example matrix could be:

$$X_L = B \cdot \begin{bmatrix} x_1 \\ x_2 \end{bmatrix} = \begin{bmatrix} 0.9 \cdot G_{in} & 1 \\ 0 & 1 \\ 0 & 1 \\ 0 & 1 \\ 0 & 1 \end{bmatrix} \cdot \begin{bmatrix} x_1 \\ x_2 \end{bmatrix}$$

where the factor 0.9 in element $b_{11}$ represents an attenuation corresponding, for example, to distance attenuation associated with Delay 1.

The delays create the different offsets for the P different paths from the source to the listener. Typically, P=4 per flutter dimension in a shoebox-shaped room. The delays can be chosen to represent the relative offsets to the smallest offset, where the common offset is disregarded. In other embodiments all delays may be set to the absolute offset, potentially dynamically adjusting to the listener position.

The delays may also be adjusted commonly to achieve an additional common delay component for the flutter echo. Such common delay component may be useful to control the offset of the flutter echo simulated by the parametric reverberator with respect to early reflections simulated by other means. For example in order to ensure an appropriate latency between the last early reflection associated with the flutter dimension and the first simulated flutter echo response from the feedback delay network.

In some cases, it may be advantageous to start flutter echoes earlier than the diffuse late reverberation part. In these embodiments, the inputs to the flutter loops may bypass the pre-delay and only pass through the dedicated flutter delays that control the start of the flutter echo simulation in relation to the source's emission. For example, the separately generated early reflections may exclude all reflections related to the flutter dimension and instead simulate these with the feedback delay network only.

In other embodiments, early reflection signals may be generated and fed into the flutter echo feedback loops of the feedback delay network. The early reflection signals may only include the reflections in the flutter dimension.

In some embodiments, the audio apparatus may be arranged such that at least one audio source signal is fed only to feedback loops that are used for flutter echo audio signal generation.

In some embodiments, the audio apparatus may comprise a spatial processor, which is arranged to apply a spatial processing to the flutter echo signal where the spatial processing is dependent on a position of the source of the audio source signal and/or a side of the room.

The spatial processing may be a processing that may modify or create a spatial cue for the flutter echo audio signal. In particular, the spatial processor may be arranged to perform a binaural processing of the flutter echo audio signal as e.g. illustrated in FIG. 18 where the spatial processor is represented by the two HRTF blocks HRTF1, HRTF2. The spatial processor may apply a binaural processing using HRTFs to generate a stereo signal that when rendered by headphones results in a spatial perception of the flutter echo originating from a suitable position/direction. For example, the binaural processing may apply an HRTF processing based on the position of one of the walls generating the flutter echo and the listener position resulting in the flutter echo being perceived to arrive from the direction of this wall.

In some embodiments, the spatially processed flutter echo audio signal may be combined with other generated audio components and it may specifically be combined with the diffuse reverberation generated by other feedback loops of the feedback delay network. However, this diffuse reverberation may not be subjected to the spatial processing as it is generally a distributed sound.

Figure 18:
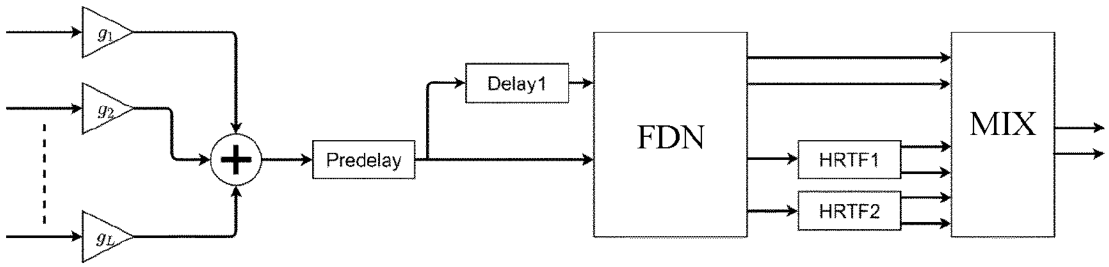
FIG. 18 illustrates an example of circuitry for a signal generator for generating an audio signal in accordance with some embodiments of the invention.

Thus, in some embodiments, the audio apparatus comprises a combiner for combining a spatially processed flutter echo audio signal with a (non-spatially processed) diffuse reverberation signal. In the example of FIG. 18, the combiner MIX may generate a stereo output signal for a set of headphones by combining the spatially processed flutter echo audio signal and a non-spatially processed diffuse reverberation signal, as well as typically other audio components, such as direct and early reflection audio components.

In many embodiments, the feedback delay network may generate the flutter echo audio signal by combining the output signals of the feedback loops that are used for generating the flutter echo audio signal. Similarly, the diffuse reverberation signal may be generated by combining output signals of the feedback loops that are used for generating the reverberation.

Typically, the feedback loops of the feedback delay network are used either for reverberation generation or for flutter echo generation.

In most embodiments, the adapter 407 may be arranged to assign a set of feedback loops to flutter echo audio signal generation with the remaining feedback loops being used for reverberation generation. In such cases, the adapter 407 may typically be arranged to keep the loops separate. Specifically, the adapter 407 may adapt feedback factors for the feedback loops such that there is no feedback from a feedback loop of the set of feedback loops used to generate the flutter echo audio signal to any other feedback loop, and vice versa. Specifically, it may set all feedback coefficients of the feedback matrix relating to a feedback between two loops belonging to the two different sets to zero.

Similarly, when generating the output signals, the flutter echo audio signal may be generated by a combination of output signals of only the feedback loops of the set of feedback loops that are used for generation of the flutter echo audio signal and the reverberation signal may be generated by a combination of output signals of only the feedback loops of the set of feedback loops that are not used for generation of the flutter echo audio signal.

In many embodiments, the output signals of flutter feedback loops may be processed in the same way as the other feedback loops by generating output signals using a weighted combination that may be represented by an extraction matrix C. This may e.g. include applying correlation and/or coloration filters as known from generation of diffuse reverberation. The resulting flutter echoes will in this case not originate from a specific direction.

However, in embodiments where the flutter echo(es) is(are) desired to be directional, the flutter echo feedback loop output signal(s) may be extracted separately for alternative processing (as in the example of FIG. 18). The extraction matrix for the (binaural) diffuse reverberation tail is of dimensions 2×(N−2), it can be extended to be 4×N, processing all N feedback loops of the feedback delay network. In the following example where N=4, the first two rows relate to the further diffuse reverberation tail processing and the last two rows relate to the flutter echoes.

$$C_{r+f}^{N} = \begin{bmatrix} 0 & 0 & & & \\ 0 & 0 & & C_r^{(N-2)} & \\ 1 & 0 & 0 & \cdots & 0 \\ 0 & 1 & 0 & \cdots & 0 \end{bmatrix}$$

The first and second output signal generated by the extraction matrix can be processed normally by the rest of the parametric reverberator functionality. The third and fourth output signals could be processed separately. For example, with different HRTF pairs corresponding to the opposing directions of both walls. These may be adaptive depending on the user's orientation.

This may be particularly advantageous in relation to embodiments where each wall is simulated in a separate loop. The first loop simulates wall 1105, and the second loop simulates wall 1107. The HRTF pair for the third output signal may correspond with the direction of wall 1105, respective to the listener, and similarly for the fourth output signal the HRTF pair may correspond with the direction of wall 1107.

For example, in FIG. 18, different HRTF pairs may be applied to the two signals (corresponding to the opposing walls). A binaural mixer may mix all three left ear signals and all three right ear signals into a single binaural output.

When soft decisions have been made on whether to generate a flutter echo audio signal, the rendering of flutter echoes may be advantageously adapted to the soft decision. For example, if the soft decision results in flutter echo estimate that includes (or consists in) a confidence value α between 0 and 1, this may control the rendering between no flutter echo effect at confidence 0 and full flutter echo effect at confidence 1.

In a particularly simple implementation, the extraction matrix elements associated with the flutter echo are multiplied by the confidence value. As a consequence, the flutter echo level will be lower if the confidence is lower. The confidence value may also be modified, for example, to achieve a non-linear behavior with respect to the confidence. E.g.

$$\alpha' = \alpha^2$$

Similarly, the confidence value can be used to modify the corresponding elements in the feedback matrix. This has the effect that the flutter echo dies out more quickly because the additional attenuation will be applied at every iteration. The confidence value may also be modified, for example, to achieve a non-linear behavior with respect to the confidence. E.g.:

$$\alpha' = \alpha^{0.41}$$

In other embodiments the parametric reverberator may cross-fade between the diffuse and flutter echo schemes described above and a normal diffuse reverberator. A simple implementation of this may cross-fade the feedback matrices for the two schemes controlled by the confidence value.

$$A_{d+f}'^{(N)} = A_{d+f}^{(N)} \cdot \alpha + A_d^{(N)} \cdot (1 - \alpha)$$

As an effect, there is some bleeding of the diffuse reverb generation into the flutter echo generation and vice versa. This makes the flutter echo more diffuse as the confidence value decreases.

Other such embodiments may additionally cross-fade other aspects of the feedback loops. This may only affect the flutter loops. Delays may be modified and/or the loop filter target spectra may be cross-faded.

It should be noted that multiple flutter echo instances may occur in a room, with different reflection rates. In some cases, there may be multiple dimensions in which there are strong reflections. In oddly shaped rooms there may be staggered surfaces in the flutter direction.

In such cases, the additional flutter echo instances may be treated as described above, using additional feedback loops. Thus, the described approach may be copied for multiple flutter echo audio signal generations. If too many feedback loops are needed for flutter echo simulation, it may be beneficial to increase the number of feedback loops in the feedback delay network structure. Typically, if the number of loops for the reverberation processing is less than eight, quality may suffer.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An audio apparatus comprising:

a receiver, wherein the receiver is arranged to receive room metadata, wherein the room metadata is indicative of a plurality of properties of a room;

an estimator circuit, wherein the estimator circuit is arranged to determine a flutter echo estimate for the room in response to the room metadata, wherein the flutter echo estimate is indicative of a level of a flutter echo in the room;

a signal generator circuit, wherein the signal generator circuit comprises a feedback delay network, wherein the feedback delay network comprises a plurality of feedback loops, wherein the signal generator circuit is arranged to generate a flutter echo audio signal from first output signals, wherein the first output signals are from a first portion of the plurality of feedback loops when the plurality of feedback loops are being fed an audio source signal; and an adapter circuit, wherein the adapter circuit is arranged to change a first parameter for a first feedback loop of the first portion of feedback loops in response to the flutter echo estimate.

2. The audio apparatus of claim 1, wherein the room metadata comprises dimension data for the room, wherein the flutter echo estimate is determined in response to a room dimension in a first direction relative to a room dimension in a second direction.

3. The audio apparatus of claim 1, wherein the room metadata comprises acoustic reflection data for sides of the room, wherein the flutter echo estimate is determined in response to an acoustic reflection attenuation of a first boundary of the room relative to an acoustic reflection attenuation of a second boundary of the room.

4. The audio apparatus of claim 1, wherein the adapter circuit is arranged to increase a feedback factor, wherein the feedback factor is for the first feedback loop, wherein the feedback factor is based on the flutter echo estimate.

5. The audio apparatus of claim 4, wherein the feedback factor is increased when the flutter echo increases.

6. The audio apparatus of claim 1, wherein each of at least a second portion of the plurality of feedback loops have a second feedback factor, wherein a third portion of the second portion are dependent on room dimensions of the room.

7. The audio apparatus of claim 1, wherein the signal generator circuit is arranged to generate a diffuse reverberation signal from outputs of a fourth portion of the plurality of feedback loops, wherein the first portion of the plurality of feedback loops does not comprise any part of the fourth portion of the plurality of feedback loops, wherein the adapter circuit is arranged to vary a fifth portion of the plurality of feedback loops in response to the flutter echo estimate, wherein the first portion of the plurality of feedback loops comprises the fifth portion of the plurality of feedback loops.

8. The audio apparatus of claim 1, wherein the signal generator circuit comprises a delay for the audio source signal, wherein the delay is applied to the audio source signal prior to a first feedback loop, wherein the first portion of the plurality of feedback loops comprises the first feedback loop, wherein the adapter circuit is arranged to change the delay in response to a position of at least one of an audio source for the audio source signal, a listener position, and a boundary of the room.

9. The audio apparatus of claim 1, wherein the first portion of the plurality of feedback loops comprises at least two feedback loops, wherein the signal generator circuit comprises a delay for the audio source signal, wherein the delay is applied to the audio source signal prior to the at least two feedback loops, wherein the delay is different for each of the at least two feedback loops.

10. The audio apparatus of claim 1, wherein the first portion of the plurality of feedback loops comprises one loop or two loops.

11. The audio apparatus of claim 1, wherein the plurality of feedback loops comprises the first portion and a sixth portion, wherein no part of the first portion of the plurality of feedback loops comprises any part of the sixth portion of the plurality of feedback loops, wherein the adapter circuit is arranged to change feedback factors for at least one of the plurality of feedback loops such that there is no feedback from a feedback loop of the first portion of the plurality of feedback loops to any feedback loop of the sixth portion of the plurality of feedback loops.

12. The audio apparatus of claim 1, further comprising:

a spatial processor circuit; and wherein the spatial processor circuit is arranged to apply a spatial processing to the flutter echo signal, wherein the spatial processing is dependent on a position of at least one of a source of the audio source signal and a boundary of the room; and a combiner circuit, wherein the combiner circuit is arranged to combine a diffuse reverberation signal and the flutter echo signal after spatial processing, wherein the signal generator circuit is arranged to generate the diffuse reverberation signal.

13. The audio apparatus of claim 1, further comprising, a spatial processor circuit, wherein the spatial processor circuit is arranged to apply a spatial processing to the flutter echo signal, wherein the spatial processing is dependent on a position of at least one of a source of the audio source signal and a side of the room.

14. The audio apparatus of claim 1, further comprising a first circuit, wherein the first circuit is arranged to feed a plurality of audio source signals to the plurality of feedback loops, wherein at least one audio source signal is fed only to feedback loops of the first portion of the plurality of feedback loops.

15. The audio apparatus of claim 1, wherein the signal generator circuit comprises a gain circuit, wherein the gain circuit is applied to the audio source signal prior to a first feedback loop, wherein the first portion of the plurality of feedback loops comprises the first feedback loop, wherein the adapter circuit is arranged to change the gain circuit in response to at least one of a position of an audio source for the audio source signal, a listener position, a position of a boundary of the room, and a reflection order for an onset of the flutter echo audio signal.

16. The audio apparatus of claim 1, wherein the flutter echo audio signal represents a flutter echo between a pair of opposing boundaries of the room, wherein the signal generator circuit comprises a frequency dependent gain circuit, wherein the gain circuit is applied to the audio source signal prior to a first feedback loop, wherein the first portion of the plurality of feedback loops comprises the first feedback loop, wherein the adapter circuit is arranged to change the gain circuit in response to acoustic reflection data of the room metadata for room boundaries, wherein the acoustic reflection data is indicative of a frequency dependent acoustic property for at least one room boundary, wherein a pair of opposing room boundaries does not comprise the at least one room boundary.

17. The audio apparatus of claim 1, wherein the first portion of the plurality of feedback loops comprises at least two feedback loops, wherein each of the at least two feedback loops have different loop gains.

18. A method comprising:

receiving room metadata, wherein the room metadata is indicative of a plurality of properties of a room;

determining a flutter echo estimate for the room in response to the room metadata, wherein the flutter echo estimate is indicative of a level of a flutter echo in the room;

generating a flutter echo audio signal from output signals of a first portion of a plurality of feedback loops when the plurality of feedback loops are fed an audio source signal, wherein a feedback delay network comprises the first portion of the plurality of feedback loops; and adapting a first parameter for a first feedback loop of the first portion of the plurality of feedback loops in response to the flutter echo estimate.

19. The method of claim 18, wherein the room metadata comprises dimension data for the room, wherein the flutter echo estimate is determined in response to a room dimension in a first direction relative to a room dimension in a second direction.

20. The method of claim 18, wherein the room metadata comprises acoustic reflection data for sides of the room, wherein the flutter echo estimate is determined in response to an acoustic reflection attenuation of a first boundary of the room relative to an acoustic reflection attenuation of a second boundary of the room.

21. The method of claim 18, wherein the adapter circuit is arranged to increase a feedback factor, wherein the feedback factor is for the first feedback loop, wherein the feedback factor is based on the flutter echo estimate.

22. The method of claim 18, wherein each of at least a second portion of the plurality of feedback loops have a second feedback factor, wherein a third portion of the second portion are dependent on room dimensions of the room.

23. A computer program stored on a non transitory medium, wherein the computer program when executed on a processor performs the method as claimed in claim 17.

* * * * *